(12) United States Patent
Khandekar et al.

(10) Patent No.: US 8,768,372 B2
(45) Date of Patent: Jul. 1, 2014

(54) SECTOR INTERFERENCE MANAGEMENT BASED ON INTER-SECTOR PERFORMANCE

(75) Inventors: Aamod Khandekar, San Diego, CA (US); Santosh Abraham, San Diego, CA (US); Alexei Gorokhov, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1097 days.

(21) Appl. No.: 12/260,834

(22) Filed: Oct. 29, 2008

(65) Prior Publication Data

US 2009/0203385 A1 Aug. 13, 2009

Related U.S. Application Data

(60) Provisional application No. 61/028,497, filed on Feb. 13, 2008.

(51) Int. Cl.
*H04W 4/00* (2009.01)

(52) U.S. Cl.
USPC ............... 455/452.1; 455/63.1; 455/278.1; 455/296; 370/332

(58) Field of Classification Search
USPC .............. 455/63.1–63.4, 522, 525, 67.13, 455/278.11, 296; 370/332, 329, 334, 328
See application file for complete search history.

(56) References Cited

U.S. PATENT DOCUMENTS

| 5,313,461 A | 5/1994 | Ahl et al. |
| 5,625,628 A | 4/1997 | Heath |
| 5,822,696 A | 10/1998 | Bergkvist |
| 5,953,323 A | 9/1999 | Haartsen |
| 5,953,665 A | 9/1999 | Mattila |

(Continued)

FOREIGN PATENT DOCUMENTS

| CN | 1518838 A | 8/2004 |
| CN | 1795645 A | 6/2006 |

(Continued)

OTHER PUBLICATIONS

Chen S. L., et al., "Capacity improvement in cellular systems with dynamic channel assignment and reuse partitioning" Personal, Indoor and Mobile Radio Communications, 2003. PIMRC 2003. 14th IEEE Proceedings on Sep. 7-10, 2003, IEEE, Piscataway, NJ, USA, vol. 2, Sep. 7, 2003, pp. 1441-1445, XP010679303.

(Continued)

*Primary Examiner* — Olumide T Ajibade Akonai
*Assistant Examiner* — Edward Zhang
(74) *Attorney, Agent, or Firm* — Kam T. Tam

(57) ABSTRACT

Providing fairness-based metrics for managing inter-sector interference of a mobile AN is described herein. By way of example, accumulation of resource utilization messages (RUMs) at a sector of the mobile AN can be based at least in part on a performance metric of that sector as compared with one or more neighboring sectors. In at least one aspect, performance metrics of multiple sectors of the mobile AN can be aggregated and a RUM accumulation rate of each sector is determined based on the aggregated metric. Accumulation rates can further be updated periodically as sector and/or aggregated metrics of the mobile AN change. Accordingly, accumulation and utilization of RUMs is based on inter-sector fairness to optimize overall wireless communication quality of service for the mobile AN.

50 Claims, 12 Drawing Sheets

(56) References Cited

U.S. PATENT DOCUMENTS

| | | | |
|---|---|---|---|
| 6,052,594 A | 4/2000 | Chuang et al. | |
| 6,285,886 B1 | 9/2001 | Kamel et al. | |
| 6,483,826 B1 | 11/2002 | Åkerberg | |
| 6,522,628 B1 | 2/2003 | Patel et al. | |
| 6,556,582 B1 | 4/2003 | Redi | |
| 6,577,608 B1 | 6/2003 | Moon et al. | |
| 6,633,762 B1 | 10/2003 | Rauscher | |
| 6,724,815 B1 | 4/2004 | Jepsen et al. | |
| 6,728,217 B1 | 4/2004 | Amirijoo et al. | |
| 6,882,847 B2 | 4/2005 | Craig et al. | |
| 6,901,060 B1 | 5/2005 | Lintulampi | |
| 6,973,326 B2 * | 12/2005 | Noh | 455/522 |
| 7,145,890 B1 | 12/2006 | Seo et al. | |
| 7,158,503 B1 | 1/2007 | Kalliojarvi et al. | |
| 7,356,049 B1 | 4/2008 | Rezvani | |
| 7,383,057 B1 * | 6/2008 | Senarath et al. | 455/522 |
| 7,474,643 B2 | 1/2009 | Malladi et al. | |
| 7,499,438 B2 | 3/2009 | Hinman et al. | |
| 7,640,013 B2 * | 12/2009 | Okita et al. | 455/418 |
| 7,966,033 B2 | 6/2011 | Borran et al. | |
| 2001/0053140 A1 | 12/2001 | Choi et al. | |
| 2002/0001299 A1 | 1/2002 | Petch et al. | |
| 2002/0012332 A1 | 1/2002 | Tiedemann, Jr. et al. | |
| 2002/0028675 A1 | 3/2002 | Schmutz et al. | |
| 2002/0172208 A1 | 11/2002 | Malkamaki | |
| 2002/0181436 A1 | 12/2002 | Mueckenheim et al. | |
| 2002/0187804 A1 | 12/2002 | Narasimha et al. | |
| 2003/0123425 A1 | 7/2003 | Walton et al. | |
| 2003/0134655 A1 | 7/2003 | Chen et al. | |
| 2004/0240402 A1 | 12/2004 | Stephens | |
| 2005/0002410 A1 * | 1/2005 | Chao et al. | 370/412 |
| 2005/0003796 A1 | 1/2005 | Kashiwase | |
| 2005/0068902 A1 * | 3/2005 | Rath | 370/256 |
| 2005/0079865 A1 * | 4/2005 | Ahn et al. | 455/434 |
| 2005/0197071 A1 * | 9/2005 | Yoshida et al. | 455/69 |
| 2005/0201325 A1 | 9/2005 | Kang et al. | |
| 2005/0281316 A1 | 12/2005 | Jang et al. | |
| 2006/0019701 A1 * | 1/2006 | Ji | 455/553.1 |
| 2006/0084459 A1 | 4/2006 | Phan et al. | |
| 2006/0114877 A1 | 6/2006 | Heo et al. | |
| 2006/0133381 A1 | 6/2006 | Wang | |
| 2006/0172716 A1 * | 8/2006 | Yoshii et al. | 455/226.1 |
| 2006/0211441 A1 * | 9/2006 | Mese et al. | 455/522 |
| 2006/0246936 A1 | 11/2006 | Gross et al. | |
| 2006/0285522 A1 * | 12/2006 | Kim et al. | 370/331 |
| 2007/0041429 A1 | 2/2007 | Khandekar | |
| 2007/0064666 A1 | 3/2007 | Kwun et al. | |
| 2007/0082619 A1 | 4/2007 | Zhang et al. | |
| 2007/0097897 A1 | 5/2007 | Teague et al. | |
| 2007/0105574 A1 | 5/2007 | Gupta et al. | |
| 2007/0105576 A1 | 5/2007 | Gupta et al. | |
| 2007/0115817 A1 | 5/2007 | Gupta et al. | |
| 2007/0135125 A1 * | 6/2007 | Kim et al. | 455/436 |
| 2007/0140168 A1 | 6/2007 | Laroia et al. | |
| 2007/0165575 A1 | 7/2007 | Niwano | |
| 2007/0168326 A1 | 7/2007 | Das et al. | |
| 2007/0173256 A1 | 7/2007 | Laroia et al. | |
| 2007/0217352 A1 | 9/2007 | Kwon | |
| 2007/0253355 A1 | 11/2007 | Hande et al. | |
| 2008/0039133 A1 | 2/2008 | Ma et al. | |
| 2008/0057934 A1 | 3/2008 | Sung et al. | |
| 2008/0101301 A1 | 5/2008 | Thomas et al. | |
| 2008/0102822 A1 | 5/2008 | Feng et al. | |
| 2008/0130586 A1 | 6/2008 | Johnson et al. | |
| 2008/0167075 A1 | 7/2008 | Kurtz et al. | |
| 2009/0023477 A1 * | 1/2009 | Staudte | 455/562.1 |
| 2009/0061871 A1 * | 3/2009 | Gross et al. | 455/436 |
| 2009/0070694 A1 | 3/2009 | Ore et al. | |
| 2009/0129333 A1 | 5/2009 | Khandekar et al. | |
| 2009/0129350 A1 | 5/2009 | Khandekar et al. | |
| 2009/0131098 A1 | 5/2009 | Khandekar et al. | |
| 2009/0135761 A1 | 5/2009 | Khandekar et al. | |
| 2009/0197588 A1 | 8/2009 | Khandekar et al. | |

FOREIGN PATENT DOCUMENTS

| | | |
|---|---|---|
| CN | 101043640 A | 9/2007 |
| EP | 1699199 A1 | 9/2006 |
| FR | 2854009 A1 | 10/2004 |
| GB | 2353189 A | 2/2001 |
| JP | H08505033 A | 5/1996 |
| JP | 11252114 A | 9/1999 |
| JP | 2002111627 | 4/2002 |
| JP | 2002217819 A | 8/2002 |
| JP | 2002232353 A | 8/2002 |
| JP | 2005210703 A | 8/2005 |
| JP | 2007514445 A | 6/2007 |
| JP | 2007521694 A | 8/2007 |
| JP | 2007295356 A | 11/2007 |
| JP | 2008510437 A | 4/2008 |
| KR | 100260457 B1 | 7/2000 |
| KR | 100765892 B1 | 10/2007 |
| RU | 2108673 | 4/1998 |
| RU | 2148891 C1 | 5/2000 |
| RU | 2183909 C2 | 6/2002 |
| RU | 2197779 C2 | 1/2003 |
| RU | 2276464 C2 | 5/2006 |
| WO | WO9416513 A1 | 7/1994 |
| WO | 9511559 A1 | 4/1995 |
| WO | 9833339 A2 | 7/1998 |
| WO | WO9908464 A1 | 2/1999 |
| WO | 0049828 | 8/2000 |
| WO | WO0070786 A1 | 11/2000 |
| WO | WO0165749 | 9/2001 |
| WO | WO0176098 A2 | 10/2001 |
| WO | WO03028245 A1 | 4/2003 |
| WO | WO2004006467 | 1/2004 |
| WO | WO2005006586 A2 | 1/2005 |
| WO | 2005036914 | 4/2005 |
| WO | WO2005043866 A1 | 5/2005 |
| WO | WO2005101888 | 10/2005 |
| WO | WO2005109705 | 11/2005 |
| WO | WO2006023536 A2 | 3/2006 |
| WO | WO2006045097 A2 | 4/2006 |
| WO | 2006096421 | 9/2006 |
| WO | 07022631 | 3/2007 |
| WO | WO2007024895 | 3/2007 |
| WO | WO2007044281 | 4/2007 |
| WO | 2007051182 | 5/2007 |
| WO | WO2007078177 | 7/2007 |
| WO | WO2007078199 A1 | 7/2007 |
| WO | WO2007092771 | 8/2007 |
| WO | 2007123519 | 11/2007 |
| WO | WO2008113966 | 9/2008 |

OTHER PUBLICATIONS

Cruz-Perez, et al., "Frequency reuse and distributed dynamic channel assignment in microcellular systems" IEEE International Symposium on Personal, Indoor and Mobile Radio Communications, Sep. 1, 1997, pp. 415-419, XP010247680.

Dae N. B., et al., "Channel state-aware joint dynamic cell coordination scheme using adaptive modulation and variable reuse factor in OFDMA downlink" Telecommunication Systems, vol. 36, No. 1-3, Dec. 4, 2007, pp. 85-96, XP019581250.

Elayoub, et al., "Performance evaluation of frequency planning schemes in OFDMA-based networks" IEEE Transactions on Wireless Communications, vol. 7, No. 5. May 2008, pp. 1623-1633, XP011215006.

Halpern, "Reuse partitioning in cellular systems" IEEE Vehicular Technology Conference, Jan. 1983, pp. 322-327, XP002096008.

Jia, et al., "On the Performance of IEEE 802.16 OFDMA System Under Different Frequency Reuse and Subcarrier Permutation Patterns" IEEE International Conference on Communications, Jun. 2007, pp. 5720-5725, XP031126581.

Johansson, "Dynamic Reuse Partitioning Within Cells Based on Local Channel and Arrival Rate Fluctuations" IEEE Transactions on Vehicular Technology, vol. 57, No. 2, Mar. 2008, pp. 1155-1165, XP011201845.

(56) References Cited

OTHER PUBLICATIONS

Kataoka, et al., "Channel information assisted reuse partitioning-a distributed dynamic channel assignment algorithm based on reuse partitioning" International Conference on Universal Personal Communications, Sep. 27, 1994, pp. 536-540, XP010131611.

Kiani, et al., "Maximizing Multicell Capacity Using Distributed Power Allocation and Scheduling" IEEE Wireless Communications and Networking Conference, Mar. 11, 207, pp. 1692-1696, XP031097456.

Klerer: "802.20 harmonized draft editing group version" IEEE P802.20-D3.0, Apr. 3, 2007, pp. 1-1 149, XP040393818 Piscataway, US.

Michael Wang, et al., "Preamble Design in Ultra Mobile Broadband Communication Systems" IEEE International Workshop on Signal Design and Its Applications in Communications, Sep. 23, 2007, pp. 328-333, XP031194263.

Mitsubishi Electric, "Combined fixed and adaptive soft-frequency reuse for inter-cell interference coordination" 3GPP Draft R1-083615, Sep. 28, 2008, XP050316974 Sophia-Antipolis, FR [retrieved on Sep. 23, 2008].

Neung-Hyung Lee, et al., "Channel allocation considering the interference range in multi-cell OFDMA downlink systems" Communication Systems Software and Middleware, 2007, COMSWARE 2007. 2N D International Conference on, IEEE, PI, Jan. 2007, pp. 1-6, XP031113903.

Onoe, et al., "Flexible re-use for dynamic channel assignment in mobile radio systems" International Conference on Communications, Jun. 11, 1989, pages 472-476, XP010081098.

Qualcomm Europe: "Description and simulations of interference management" 3GPP Draft R1-050896, Aug. 24, 2005, XP050100516 Sophia-Antipolis, FR.

Rahman, et al., "Interference Avoidance through Dynamic Downlink OFDMA Subchannel Allocation using Intercell Coordination" IEEE Vehicular Technology Conference, May 11, 2008, 1630-1635, XP031255841.

Seok H. W., et al., "Inter-Cell Interference Coordination/Avoidance for Frequency Reuse by by Resource Scheduling in an OFDM-Based Cellular System" IEEE Vehicular Technology Conference, Sep. 1, 2007, pp. 1722-1725, XP031147702.

Steven L. C., et al., "Dynamic Channel Assignment with Flexible Reuse Partitioning in Cellular Systems" Wireless Personal Communications, vol. 42, No. 2, Aug. 16, 2006, pp. 161-183, XP019509800.

Stolyar, et al.. "Self-Organizing Dynamic Fractional Frequency Reuse in OFDMA Systems" IEEE Conference on Computer Communications, Apr. 13, 2008, pp. 691-699, XP031263869.

Wang, et al., "Interference Management and Handoff Techniques in Ultra Mobile Broadband Communication Systems" IEEE International Symposium Onspread Spectrum Techniques and Applications, Aug. 25, 2008, pp. 166-172, XP031319003.

Young-June Col., et al., "Flexible Design of Frequency Reuse Factor in OFDMA Cellular Networks" IEEE International Conference on Communications, Jun. 2006, pp. 1784-1788, XP031025320.

International Search Report, PCT/US2008/083045—International Search Authority—European Patent Office, Apr. 2, 2009.

Written Opinion, PCT/US2008/083045—International Search Authority—European Patent Office, Apr. 2, 2009.

Kaist: "Spread Spectrum Systems", Fall semester 2000, pp. 1-37.

Marc C. et al., "Coordinated Fractional Frequency Reuse", MSWiM'07, Oct. 22-26, 2007, pp. 296-305.

Taiwan Search Report—TW097144262—TIPO Oct. 29, 2012.

* cited by examiner

SECTOR INTERFERENCE MANAGEMENT BASED ON INTER-SECTOR PERFORMANCE

CLAIM OF PRIORITY UNDER 35 U.S.C. §119

The present Application for Patent claims priority to Provisional Application No. 61/028,497 entitled ADAPTIVE ALGORITHMS FOR INTERFERENCE MANAGEMENT MESSAGING WITH INTER-SECTOR FAIRNESS IN A WIRELESS NETWORK filed Feb. 13, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"PREAMBLE DESIGN FOR A WIRELESS SIGNAL" by Aamod Khandekar et al., having Ser. No. 12/260,826, filed concurrently herewith, assigned to the assignee hereof, and expressly incorporated by reference herein;

"PREAMBLE DESIGN FOR A WIRELESS SIGNAL" by Aamod Khandekar et al., having Ser. No. 12/260,856 U1, filed concurrently herewith, assigned to the assignee hereof, and expressly incorporated by reference herein; and "PREAMBLE DESIGN FOR A WIRELESS SIGNAL" by Aamod Khandekar et al., having Ser. No. 12/260,861 U2, filed concurrently herewith, assigned to the assignee hereof, and expressly incorporated by reference herein; and "PREAMBLE DESIGN FOR A WIRELESS SIGNAL" by Aamod Khandekar et al., having Ser. No. 12/260,868 U3, filed concurrently herewith, assigned to the assignee hereof, and expressly incorporated by reference herein.

"BACKHAUL SIGNALING FOR INTERFERENCE AVOIDANCE" by Aamod Khandekar et al., having Ser. No. 12/260,849, filed concurrently herewith, assigned to the assignee hereof, and expressly incorporated by reference herein.

BACKGROUND

I. Field

The following relates generally to wireless communication, and more specifically to providing idle mode mobility management for multiple mobile communication environments.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

One important aspect of mobile communication technology is managing interference among transmitters. A typical cell of a cellular phone site, for instance, utilizes multiple transceiver base stations to communicate with user terminals within the cell. Transmission area of the base stations typically overlap, such that a single receiver often obtains several overlapping signals at a given point in time. Accordingly, signal interference results at such receivers, potentially reducing signal clarity and cell communication quality if left uncorrected.

Many mechanisms exist for reducing intra-site interference. Some involve utilizing MISO and MIMO transceivers that can tolerate higher levels of interference, due to improved signal analysis at the receiver. Newer modulation techniques, such as orthogonal multi-carrier modulation (e.g., as utilized with orthogonal frequency division multiplexing [OFDM]), can effectively reduce signal interference. OFDM employs orthogonal sub-carrier frequencies to greatly reduce cross-talk interference among carrier signals. Another technique includes requesting transmission power reduction of a dominant interferer on one or more channel resources. If transmission power of the interferer is maintained within an acceptable range, overlapping signals on a channel resource can often be tolerated at a receiver.

Mobile communication systems are in constant state of flux, however, as new research and technologies are discovered. Architectural changes in mobile technology are implemented to increase data rates, bandwidth, or to progress to all-data communications. The interference problem typically must be re-visited for each new technology, to determine whether the balance provided by previous interference management mechanisms will be disturbed. Thus, signal interference management is an ongoing problem, requiring new solutions as new mobile communications technologies are implemented.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides interference management for a mobile wireless access network (AN) based on performance metrics of sectors of the AN. Performance metrics can include various quality of service (QoS) parameters, such as average data rate, median data rate, meeting guaranteed bit rate requirements, and/or the like. Accumulation of resource utilization messages (RUMs) at a sector can be based at least in part on a performance metric of that sector as compared with one or more neighboring sectors. In at least one aspect, multiple sector performance metrics can be aggregated and RUM accumulation rate of each sector is determined based on the aggregated metric. Accumulation rate can be managed over time and changed as sector and/or aggregated metrics change. Accordingly, accumulation and utilization of RUMs is based on inter-sector fairness to optimize average sector transmission quality of the mobile AN.

In one or more aspects, disclosed is a method of managing mobile communications. The method can comprise obtaining, at a sector of a mobile AN, a performance metric for at least one neighboring sector. Furthermore, the method can comprise implementing inter-sector resource utilization fairness based at least in part on the performance metric of the neighboring sector(s).

According to other aspects, provided is an apparatus that manages wireless communications. The apparatus can comprise a data collector that obtains, at a sector of a mobile AN, a performance metric for at least one neighboring sector. In addition, the apparatus can comprise a management module that implements inter-sector resource utilization fairness based at least in part on the performance metric of the neighboring sector(s). Further, the apparatus can comprise memory that stores one or more of obtained performance metric data, instructions for process modules of the apparatus or results of process operations and a processor that executes process module instructions stored in the memory to implement functions of the apparatus.

In one or more aspects, disclosed is an apparatus configured to manage mobile communications. The apparatus can comprise means for obtaining, at a sector of a mobile AN, a performance metric for at least one neighboring sector. Additionally, the apparatus can comprise means for implementing inter-sector resource utilization fairness based at least in part on the second performance metric of the neighboring sector(s).

According to other aspects, disclosed is a processor configured to manage mobile communications. The processor can comprise a first module that obtains, at a sector of a mobile AN, a performance metric for at least one neighboring sector. Further, the processor can comprise a second module that implements inter-sector resource utilization fairness based at least in part on the performance metric of the neighboring sector(s).

Further to the above, provided is a computer-readable medium comprising computer-readable instructions configured to manage mobile communications. The instructions can be executable by at least one computer to obtain, at a sector of a mobile AN, a performance metric for at least one neighboring sector. Further, the instructions can be executable by at least one computer to implement inter-sector resource utilization fairness based at least in part on the performance metric of the neighboring sector(s).

According to one or more additional aspects, disclosed is a method of facilitating wireless communication. The method can comprise obtaining an over-the-air (OTA) transmission that comprises a signal performance metric of a mobile base station. The method can additionally comprise facilitating inter-sector resource utilization fairness at least in part by forwarding the signal performance metric to a serving mobile base station.

According to other aspects, provided is an access terminal (AT). The AT can comprise a receiver that obtains a first OTA transmission comprising a signal performance metric of a mobile base station. The AT can further comprise a routing module that facilitating inter-sector resource utilization fairness at least in part by wirelessly transmitting the signal performance metric to a serving mobile base station. In addition, the AT can comprise memory that stores data and process modules for the AT and a processor that executes process module instructions to implement functions of the AT.

In still other aspects, disclosed is an apparatus that facilitates wireless communication. The apparatus can comprise means for obtaining a first OTA transmission comprising a signal performance metric of a mobile base station. The apparatus can further comprise means for facilitating inter-sector resource utilization fairness at least in part by wirelessly transmitting the signal performance metric to a serving mobile base station. Additionally, the apparatus can comprise means for storing data and process modules for the apparatus and means for processing that executes process module instructions to implement functions of the apparatus.

In at least one aspect, provided is a processor configured to facilitate wireless communication. The processor can comprise a first module that obtains an OTA transmission that comprises a signal performance metric of a mobile base station. Additionally, the processor can comprise a second module that implements inter-sector resource utilization fairness at least in part by forwarding the signal performance metric to a serving mobile base station.

In accordance with one or more other aspects, disclosed is a computer-readable medium comprising computer-readable instructions configured to facilitate wireless communication. The instructions are executable by at least one computer to obtain an OTA transmission that comprises a signal performance metric of a mobile base station. Additionally, the instructions are executable by the at least one computer to implement inter-sector resource utilization fairness at least in part by forwarding the signal performance metric to a serving mobile base station.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
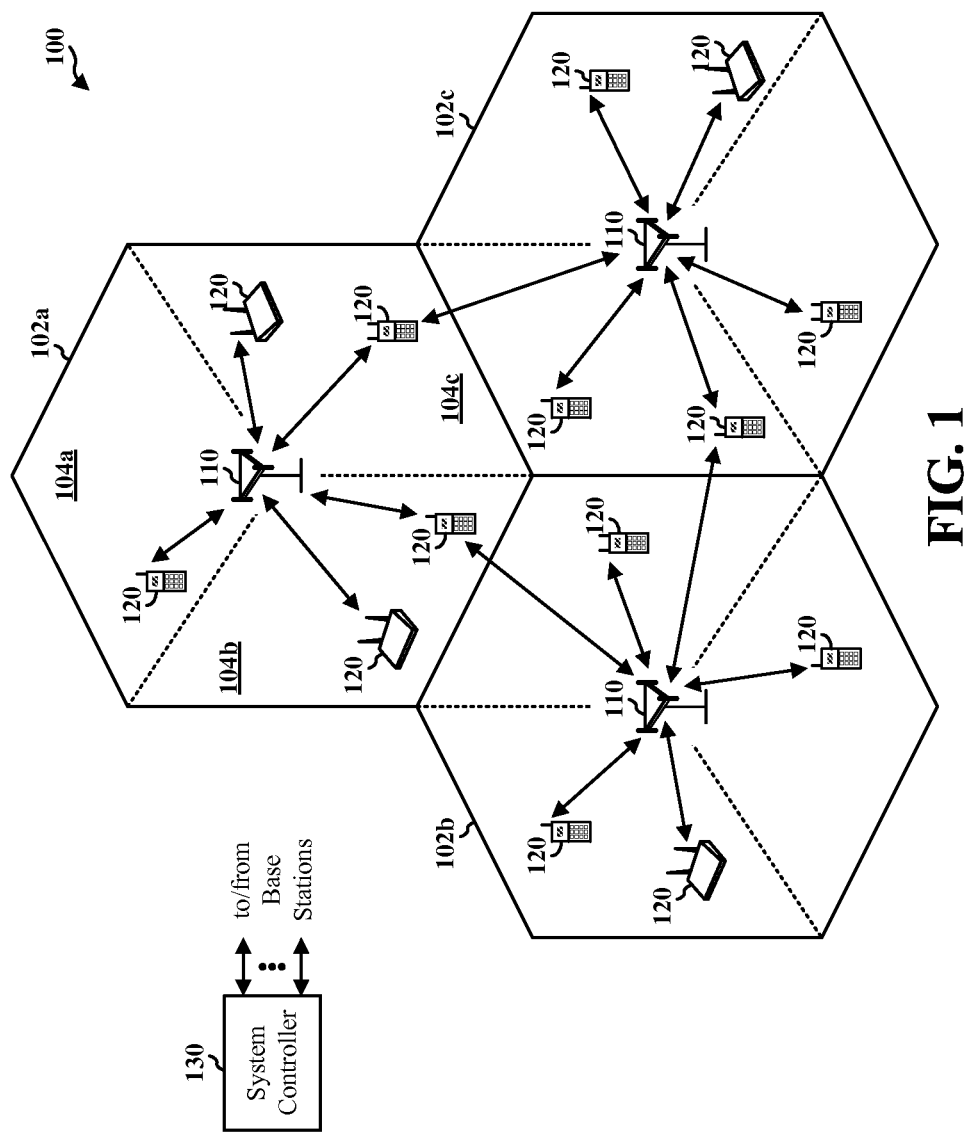
FIG. 1 illustrates a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of determining a RUM accumulation rate for one or more sectors of a mobile network based on a performance metric of multiple sectors. One skilled in the art should appreciate that similar techniques could apply to other communication environments.

The subject disclosure provides for implementing resource utilization fairness among sectors of a mobile access network (AN). Fairness can be based, at least in part, on a performance metric of one sector of the mobile AN compared with a performance metric of another sector. In at least one aspect of the subject disclosure, the resource utilization fairness can be implemented by establishing and/or adjusting accumulation of interference avoidance credits (e.g., comprising a resource utilization message [RUM]) for sectors of a mobile AN. An interference avoidance credit can be utilized to modify interference between neighboring sectors of a wireless AN. In one example, an interference avoidance credit can be issued to a neighboring sector, requesting that sector modify transmit power on a subset of wireless resources. The interference avoidance credit can specify the particular resources for reduced interference, the degree of modified transmit power, or both. In another example, the interference avoidance credit can result in a sector modifying its own transmit power on a subset of wireless resources. Because interference typically results from relative signal levels obtained at a receiver, modification of a sector's own transmit power can also affect interference at terminal devices served by the sector. In addition to the foregoing, accruing an interference avoidance credit can lead to no action taken by a sector (e.g., no modification or request to modify transmit power). A decision of what type of action is most appropriate can be based on performance metric of a neighboring sector, performance metric of the sector, an aggregate performance metric of a plurality of sectors, interference observed at terminal devices, sector load, or the like, as discussed herein.

One example of an interference avoidance credit is a RUM. RUMs are messages issued to/by a wireless communication device to instruct nearby transmitters to reduce their transmit power. Typically, the decision to issue a RUM is based on signal interference at the communication device resulting from one or more interfering transmitters. A device receiving a RUM can reduce it's transmit power by a predetermined factor, which should reduce interference at the device issuing the RUM. To implement fairness, performance metrics of multiple sectors can be compared to determine whether one or more sectors are disadvantaged with respect to other sectors, or an aggregate of the sectors. Accumulation, issuance, and/or weighting of RUMs, or interference avoidance credits in general (including modification of a sector's own transmit power), can be adjusted to mitigate disadvantaged sectors (e.g., sectors having a relatively low performance metric) from being excessively hampered by RUMs issued from neighboring sectors, or to mitigate non-disadvantaged sectors from accumulating/issuing an excessive number of RUMs.

It should be appreciated that a wireless AN can utilize both reverse link (RL) RUMs and forward link (FL)/downlink (DL) RUMs. A FL/DL RUM is a RUM transmitted by a base station of the wireless AN to interfering ATs. The ATs receive the FL RUM and determine whether to obey the RUM, as described in more detail hereinafter. If the RUM is obeyed, the ATs can reduce power on RL channels, reducing interference at the issuing base station (and, e.g. other base stations in a vicinity of the AT). In contrast, a RL RUM is issued by an AT (e.g., utilizing a RUM accumulated by a serving sector associated with the AT) to one or more neighboring base stations of the wireless AN. The base stations determine whether to obey the RL RUM, and can reduce FL transmission power if the RL RUM is obeyed. As discussed below, accumulation and/or adjustment of RUM accumulation or issuance rates can apply to either or both of DL and FL RUMs In a mobile environment, access terminals (ATs) and base stations increase transmit power at various times based on various factors. For instance, a base station might receive a signal from an AT indicating that signals transmitted by the base station are received with very low power at the AT. Thus, the base station might increase transmit power to improve communication with the AT. Furthermore, where a device transmission has low signal to noise ratio (SNR) characteristics at a receiver, the transmit power of the signal can be increased. Increased transmit power can lead to interference at nearby devices, however. Thus, the RUM provides feedback to a device indicating that the transmit power of the device is too high for other nearby devices.

RUMs can have drawbacks, however. For instance, a single device can monopolize sector communication by issuing too many RUMs to nearby devices. If the other devices excessively reduce their transmit power based on multiple received RUMs, quality of communication of such devices can suffer. Thus, accumulation and/or issuance of RUMs for a device must be managed so that a few devices do not reduce transmission quality for nearby devices. In effect, fairness principles can be enforced to provide good overall communication for devices in a wireless AN.

In one aspect of the disclosure, a number of RUMs that a sector of a wireless AN can issue at a given time depends on a number of such RUMs that have been accumulated for the sector (e.g., in a RUM 'token bucket' so to speak, associated with the sector). A rate at which the sector accumulates RUMs is termed a RUM accumulation rate. Accumulated RUMs associated with the sector are decremented when the sector issues a RUM (e.g., on behalf of a base station or mobile device in the sector). Thus, the RUM accumulation rate can, at least in part, govern a rate at which the sector can send out RUMs.

In at least one aspect of the subject disclosure, accumulation of RUMs is determined on a sector-by-sector basis. A rate at which a sector accumulates RUMs can be based on a performance metric of the sector in comparison with a like performance metric of one or more nearby sectors. The accumulation of RUMs can be established, increased and/or decreased based on a comparison of the sector performance metrics. It should be appreciated that establishing and/or adjusting RUM accumulation rates, as described herein, can apply to either FL or RL RUMs, or both. Further, performance metrics can be monitored over time to adjust/maintain RUM accumulation based on contemporary changes in the monitored metrics. Thus, the disclosure provides for implementing inter-sector fairness based on performance of various sectors of a mobile AN.

In at least one aspect, sector performance metrics can be collected over a backhaul network between base stations. In another aspect, the metrics can be collected at a designated base station, shared among various base stations, or managed at a centralized location (e.g. a centralized component of a radio access network [RAN], a component of a mobile back-end network coupled with each of the various base stations, or the like). According to further aspects, one or more ATs can collect the performance metrics from base stations in the wireless AN and forward the collected metrics to a serving base station associated with the ATs. For instance, an AT can decode the performance metrics over-the-air (OTA) from broadcast transmissions of nearby base stations of the wireless AN (e.g., where such broadcast transmissions have adequate SNR characteristics at an AT). The AT can then forward the performance metric information to a serving base station coupled with the AT. Alternatively, in some aspects, the AT can re-transmit and/or forward the broadcast transmissions to the serving base station which can decode the performance metrics from the re-transmitted/forwarded signal.

In one or more other aspects, sector RUM accumulation rates are determined based on aggregate sector performance. For instance, a base station of a wireless AN can collect performance metric information of neighboring base stations from such base stations (e.g., over a backhaul network) and/or from ATs served by the base station of the wireless AN. The collected information can be aggregated at the base station (or, e.g., at a central controller of the wireless AN in some instances) to provide an aggregate performance metric of a set of base stations of the wireless AN. A performance metric of an individual sector (or, e.g., each sector of the wireless AN) can then be compared to the aggregate data to determine a degree of disadvantage of the individual sector as compared with the aggregated data. The degree of disadvantage, if any, can be utilized to establish and/or update a RUM accumulation rate for the sector. For instance, the RUM accumulation rate can be increased, decreased or maintained based on a sector performance metric as compared with the aggregate data. By aggregating data of neighboring sectors at an individual sector, variations in relative interference as observed at an individual sector can be established.

According to still other aspects, a rate at which a sector issues RUMs, or associates RUMs with ATs within the sector can be based on an aggregate performance metric as well. Thus, where a sector has poor median data rates as compared with an aggregate of sectors, a RUM accumulation rate and/or issuance rate of that sector can be increased. If, at a later time, the sector median data rate improves relative to the aggregate sector data, the accumulation/issuance rate can be maintained or reduced, as appropriate. Thus, the subject disclosure provides for controlled accumulation and/or issuance of RUMs based on sector performance, and further provides a mechanism to adjust sector performance by increasing/decreasing rates at which RUMs are accumulated at various sectors.

As used in the subject disclosure, the terms "component", "system", "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process and/or thread of execution and a module can be localized on one electronic device and/or distributed between two or more electronic devices. Further, these modules can execute from various computer-readable media having various data structures stored thereon. The modules can communicate by way of local and/or remote processes such as in accordance with a signal having one or more data packets (e.g. data from one component interacting with another component in a local system, distributed system, and/or across a network such as the Internet with other systems by way of the signal). Additionally, components or modules of systems described herein can be rearranged and/or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with an access terminal—AT. An AT can also be called a system, a subscriber unit, a subscriber station, mobile station, mobile, mobile communication device, mobile device, remote station, remote terminal, user terminal (UT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more application specific integrated circuits (ASICs), digital signal processors (DSPs), digital signal processing devices (DSPDs), programmable logic devices (PLDs), field programmable gate arrays (FPGAs), discrete gate or transistor logic, discrete hardware components, general purpose processors, controllers, microcontrollers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer-readable medium, which can be incorporated into a computer program product. The term "article of manufacture" as used herein is intended to encompass a computer program accessible from any computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a wireless communication system 100 with multiple base stations 110 and multiple terminals 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The RUM accumulation/utilization techniques described herein can be used for a system with sectorized cells as well as a system with multiple un-sectorized cells (e.g. a plurality of cells of a larger geographic area). For simplicity, in the following description, unless specified otherwise, the term "base station" is used generically for a fixed station that serves a sector as well as a fixed station that serves a cell. In addition, the term "wireless AN" is used generically to refer to a geographic cell comprising multiple sectors, or a geographic area comprising multiple cells.

Terminals 120 are typically dispersed throughout the system, and each terminal 120 can be fixed or mobile. Terminals 120 can also be called a mobile station, user equipment, a user device, or some other terminology, as discussed above. A terminal 120 can be a wireless device, a cellular phone, a personal digital assistant (PDA), a wireless modem card, and so on. Each terminal 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations. As used herein, a base station with which a terminal 120 maintains an active communication or an active registration is termed a "serving base station".

For a centralized architecture, a system controller 130 couples to base stations 110 and provides coordination and control for base stations 110. For instance, as discussed herein, the system controller can facilitate obtaining performance metric data for multiple base stations 110, aggregating the data, and providing RUM accumulation information based on the aggregate data. For a distributed architecture, base stations 110 can communicate with one another as needed (e.g., employing a backhaul network, not depicted). Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
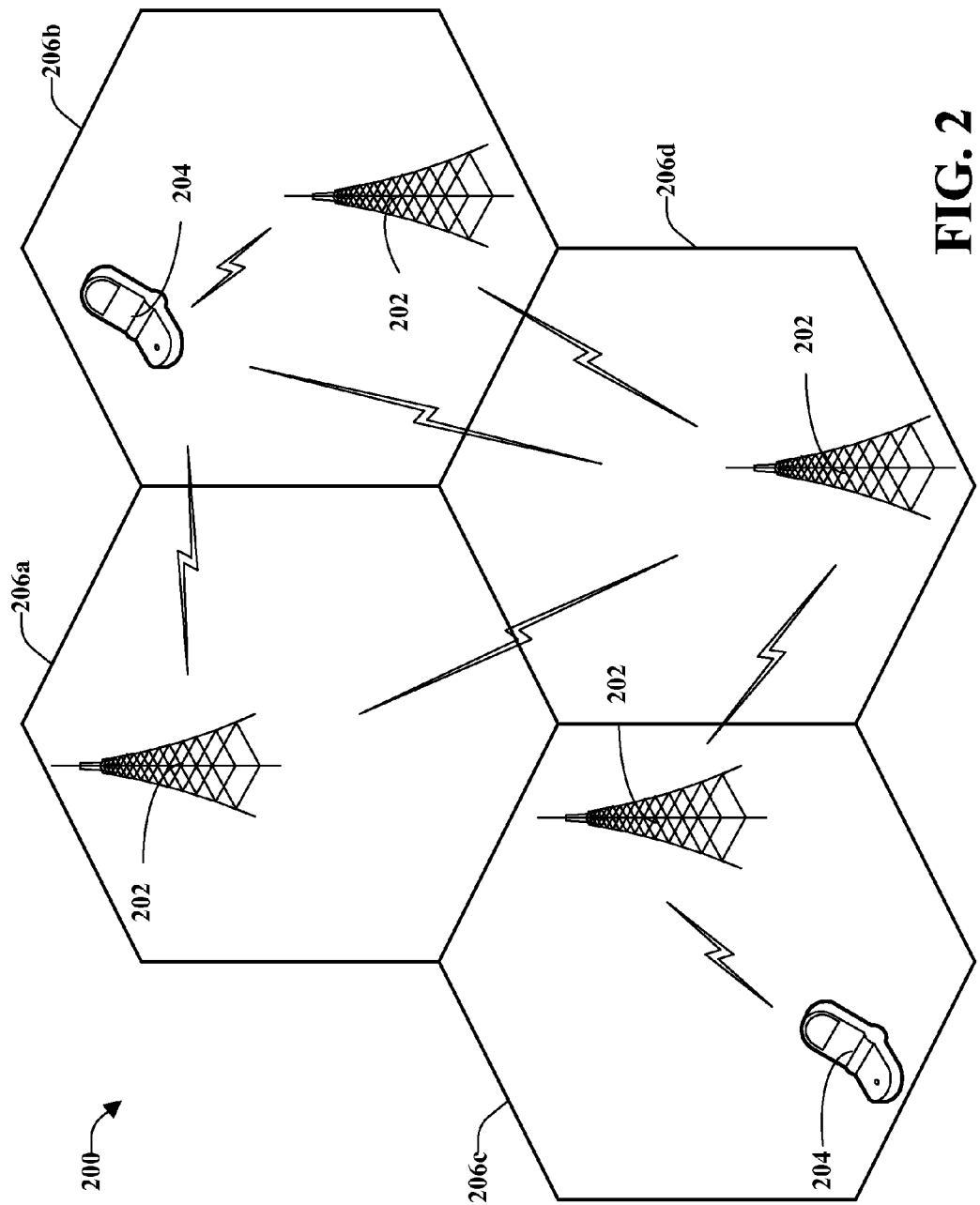
FIG. 2 depicts a block diagram of an example communication apparatus for employment with a wireless communication environment.

FIG. 2 is an illustration of an ad hoc or unplanned/semi-planned wireless communication environment 200, in accordance with various aspects. System 200 can comprise one or more base stations 202 in one or more cells and/or sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate providing a wireless communication environment (200), as set forth herein.

Figure 3:
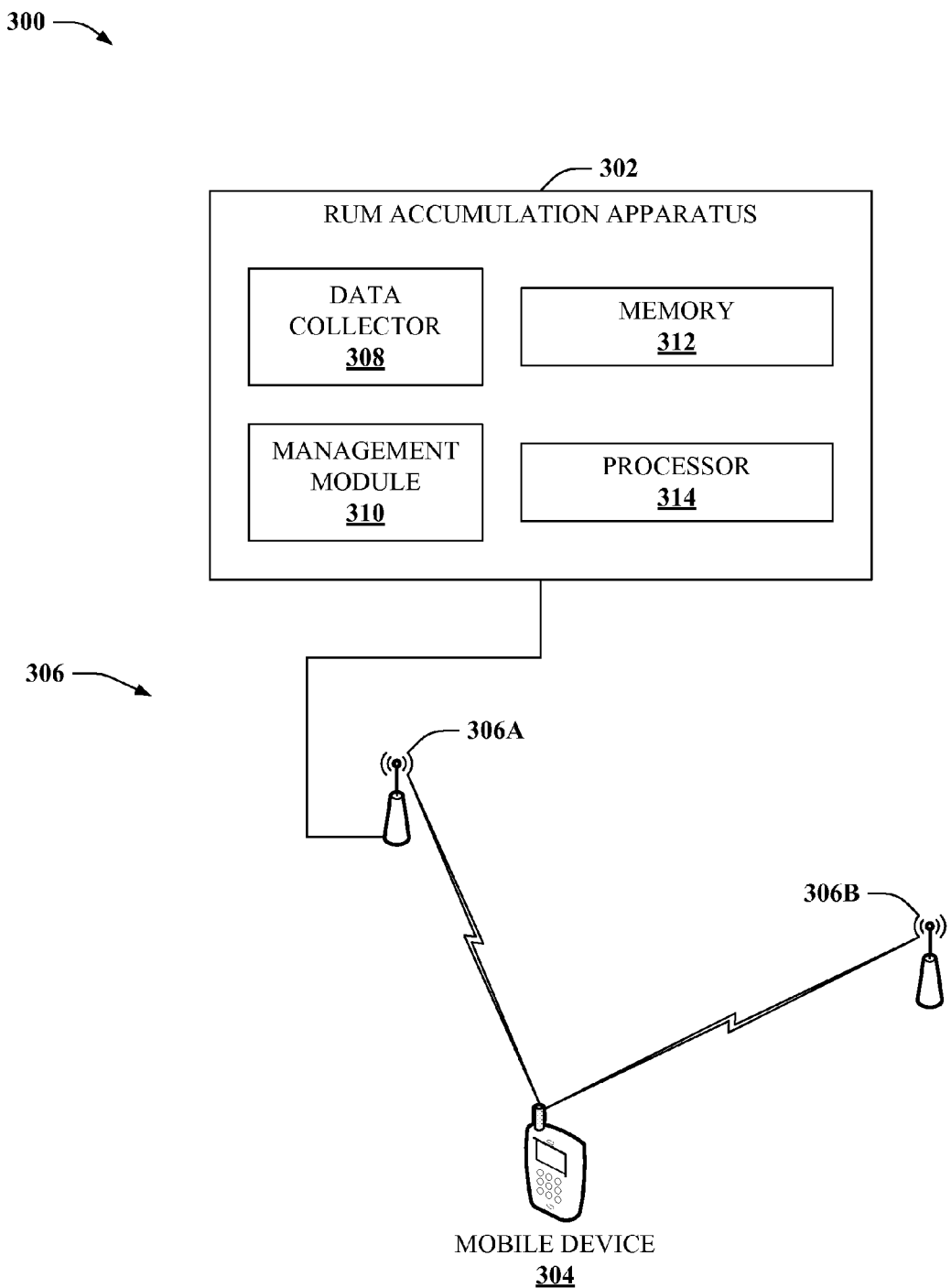
FIG. 3 illustrates a block diagram of an example system that determines sector resource utilization message (RUM) accumulates rates of a mobile AN.

FIG. 3 illustrates a block diagram of an example system 300 that provides performance based RUM accumulation for various sectors of a mobile AN 306. A RUM accumulation apparatus 302 can be coupled with base stations 306A, 306B, providing management of RUMs for sectors and devices (304) coupled with such base stations 306A, 306B. One or more performance metrics of the sectors (306A, 306B) can be determined and RUM accumulation for each sector can be based on a comparison of the metric for that sector with at least one other sector. Accordingly, RUM accumulation can be managed to provide inter-sector fairness of the mobile AN 306.

RUM accumulation apparatus 302 can comprise a data collector 308 that obtains a performance metric for a sector of a mobile AN 306A and at least one neighboring sector 306B. The performance metric can comprise various suitable quality of service parameters associated with wireless communication. Example performance metrics can include median data rate, average data rate, interference level, SNR, ratio of guaranteed bit rate to median/average bit rate, achieved packet delay, achieved packet delay as compared to a target or guaranteed packet delay, and/or the like or a combination thereof. The performance metric(s) for a sector (306A, 306B) can be calculated and obtained from a base station 306A, 306B serving the sector (306A, 306B), or from a mobile device 304 communicating with such base station 306A, 306B. The performance metric(s) data can be forwarded to the data collector 308 via a communication link coupling the RUM accumulation apparatus with the base stations 306A, 306B and/or a wireless link with the mobile device 304.

RUM accumulation apparatus 304 can further comprise a management module 310 that establishes a rate at which devices (304) within a sector (306A, 306B) accumulate RUMs. The established RUM accumulation rate(s) can be based on a comparison of a performance metric pertinent to a particular sector (e.g., 306A) as compared with a like performance metric pertinent to at least one additional sector (e.g., 306B), or aggregated performance metric data from multiple sectors. As a more particular example, a median data rate pertaining to sector A (306A) served by base station 306A can be forwarded to the data collector 308. Further, a median data rate pertaining to sector B (306B) served by a neighboring base station 306B can be forwarded to data collector 308. A RUM accumulation rate for sector 306A and related devices (304) can be based at least in part on a comparison of the median data rate of sector A as compared with a median data rate of sector B. According to some aspects, the RUM accumulation rate can be updated based on a further such comparison, for instance that is determined at periodic times, after a threshold change is detected in the performance metric(s) of the respective sectors (306A, 306B), and/or the like or a combination thereof.

Data collected by data collector 308 can be stored in memory 312 (which, e.g. can comprise any suitable form of electronic and/or magnetic storage media such as disk drives, optical discs, flash memory, random access memory, and/or the like). Further, results of performance metric comparisons conducted by management module 310 can be stored in memory 312 for reference. For instance, when determining whether to update a determined RUM accumulation rate based on changes in a performance metric(s), the results or prior RUM accumulation rate(s) can be obtained from memory 312. Rum accumulation apparatus 302 further comprises a processor 314 configured to execute instructions on data stored in memory 312 pertinent to processes of the RUM accumulation apparatus 302 (e.g., data collection and storage in memory, parsing metrics v. sectors, comparing metrics for one sector v. one or more other sectors, determining RUM accumulation rates based on such comparisons, updating RUM accumulation rates, and so on).

It should be appreciated that any number of base stations 306A, 306B can be included in the radio access network (RAN) 306 of system 300. Base stations 306A, 306B can include various wireless transmitters including cellular transceivers, wireless fidelity (WiFi) transmitters, microwave frequency transmitters (e.g., worldwide interoperability for microwave access [WiMAX]), and/or the like, coupled to a common wireless mobile RAN site 306. Thus, various cellular, mobile communication, and like access technologies can be included in the mobile RAN site of 306.

Figure 4:
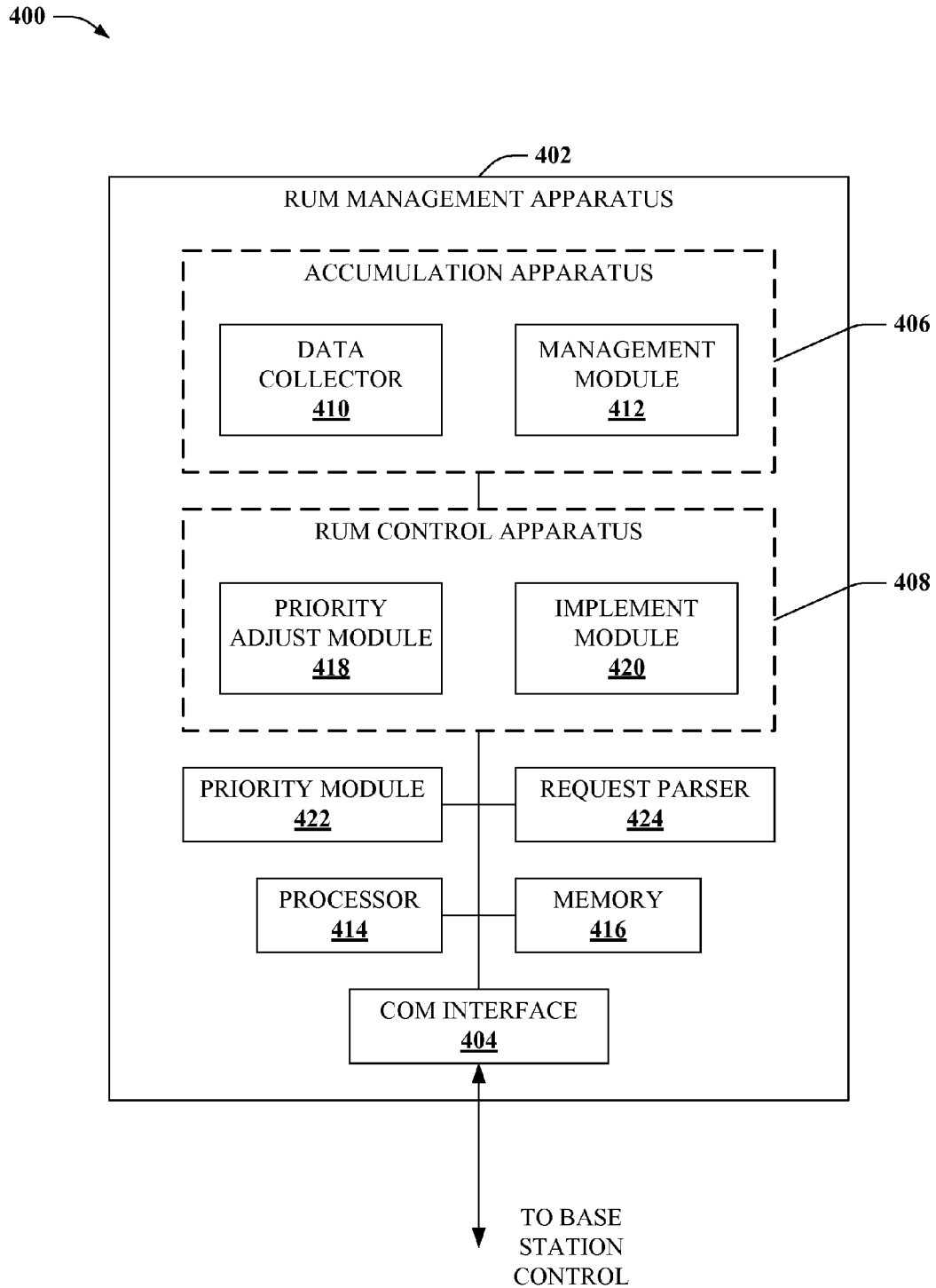
FIG. 4 illustrates a block diagram of a sample RUM management apparatus according to aspects of the subject disclosure.

FIG. 4 illustrates a block diagram of an example RUM management apparatus 402 according to one or more aspects of the subject disclosure. Apparatus 402 can be coupled with a centralized controller of a RAN (e.g., see system controller 130 of FIG. 1, supra), or can be distributed across one or more base stations of the RAN (e.g., base stations 306A, 306B of FIG. 3, supra or backhaul network 506 of FIG. 5, infra). The apparatus 402 can obtain performance metrics of wireless communications provided by such base stations, aggregate the data, and determine and update sector RUM accumulation rates based on sector metrics compared with aggregate metric data. Accordingly, system 400 provides a fairness-based RUM accumulation technique that can determine a desirable communication metric and optimize overall operation of the RAN based on changing communication metric levels.

RUM management apparatus 402 can comprise an accumulation apparatus 406 that receives data via a communication interface 404 with components of a RAN (e.g., base stations). The accumulation apparatus 406 comprises a data collector 410 that obtains performance metric data pertaining to sectors of the RAN, and a management module 412 that determines a RUM accumulation rate for sectors of the RAN, based on comparison of a sector performance metric with a performance metric of at least one other sector. Thus, apparatus 402 can provide fairness-based sector RUM accumulation rates based on desirable metrics pertinent to wireless communication. Thus, sectors exhibiting poor metrics can be given a higher RUM accumulation rate, resulting in more RUMs issued to devices of the poor sector. Sectors exhibiting relatively strong metrics can be given a lower RUM accumulation rate, resulting in fewer RUMs issued to devices of the strong sectors. Thus, by having more RUMs, the poor metric sectors can more readily reduce transmission power of neighboring interfering transmitters. Likewise, the strong metric sectors have a lesser ability to reduce transmission power of neighboring transmitters. Such an arrangement provides a significant benefit. First, devices that most need to reduce power of interfering transmissions are given a greater opportunity to do so. Further, devices that have little need to reduce power of interfering transmissions have a lesser opportunity to do so. Where a poor sector neighbors a strong sector, it is significant that the poor sector be able to reduce transmission power of the neighboring sector, while avoiding significant reduction of its own signal power by RUMs issued to the strong sector.

RUM management apparatus 402 can further comprise a RUM control apparatus 408. The control apparatus 408 can establish rates for devices to issue accumulated RUMs based on inter-sector performance metrics. Further, the control apparatus 408 can manage RUM accumulation rates based on changing sector performance metrics; accumulation rates can be updated based on changing disparities in a sector's performance metric(s) as compared with metrics of neighboring sectors.

Control apparatus 408 can comprise an implementation module 420 that establishes a rate that devices of a sector can issue accumulated RUMs. The issuance rate can be determined in addition to accumulation rates determined by the RUM accumulation apparatus 406. Thus, a device can accumulate a number of RUMs over time, but can be limited in how quickly it can utilize those RUMs. Therefore, if a performance metric for the device suddenly changes dramatically for the worse, the device's ability to issue many accumulated RUMs in a short period of time, which can significantly degrade performance of nearby devices, can be modulated at least by the number of RUMs accumulated for a sector serving the device. In at least one other aspect, RUM issuance can further be limited by a max RUM issuance rate. In yet other aspects, the RUM issuance rate can depend on a degree of disadvantage of the sector. In at least one aspect, RUM issuance can be modulated by a combination of the foregoing or like mechanisms.

As discussed above, RUM issuance rates can be a predetermined rate and/or sector-specific rate established based on performance metric comparisons similar to those determined by management module 412 for establishing accumulation rates (e.g. that establish a degree of disadvantage of a sector as compared with other sectors). In one or more aspects, the issuance rate is modulated by an associated RUM accumulation rate (e.g. of RUMs of unit weight, or in other aspects, modulation can include weights of weighted RUMs) for a sector serving a device. In such aspects, the implementation module 420 can optionally determine whether a terminal within the sector sends a RUM based on the RUM accumulation rate, RUM issuance rate, comparison of performance metrics, sector disadvantage, or a combination of these and/or like factors.

Control apparatus 408 can further comprise a priority adjustment module 418 that can update RUM accumulation rates of sectors of a RAN. Rate updates can be based at least in part on current performance metric comparisons for such sectors as compared with one or more neighboring sectors. The following example is provided to illustrate one aspect in which RUM accumulation rates can be determined; it should not be construed as limiting however. Rather, other mechanisms for updating RUM accumulation rates based on performance metrics of multiple sectors of a RAN known by those of skill in the art or made known to those of skill in the art by way of the context provided herein, are included herein as part of the subject disclosure.

For purposes of the following example, the following quantities are defined:

$m_i(k)$=median performance metric of ATs of sector i at epoch k $r_i(k)$=rate of RUM accumulation at sector i at epoch k $M_i(k)$=Median of $m_j(k)$ $\forall$ j that are neighbors of i, including i At the end of a RUM rate adaptation epoch (k) (e.g., a period of time at the end of which the priority adjustment module 418 determines updated RUM rates) a sector can update $r_i$ for epoch (k+1) (or, e.g., leave $r_i$ substantially unchanged where suitable). The updated $r_i$ is stored in memory 416 and can be utilized to generate RUMs at a modified rate by processor 414 during epoch (k+1). RUM accumulation rate adaptation can be based on fairness criteria utilizing a comparison of a sector's performance compared with an aggregate performance data of one or all other sectors j, including the sector i in at least some embodiments. The following algorithms provide one mechanism for updating $r_i$ based on inter-sector fairness:

If $m_i(k) < M_i(k)$ then $r_i(k+1) = r_i(k) + \Delta^+_i(k)$ (where $\Delta^+_i(k)$ is a positive quantity)

If $m_i(k) \geq M_i(k)$ then $r_i(k+1) = r_i(k) - \Delta^-_i(k)$ (where $\Delta^-_i(k)$ is a positive quantity)

Thus, where a median performance metric (e.g., data rate) of a sector $m_i(k)$ is less than the median performance metric of a plurality of sectors $M_i(k)$ (e.g., all sectors j including sector i), the RUM accumulation rate of sector i $r_i$ can be increased by a positive amount. In contrast, where the median performance metric of sector i is less or equal to the median performance metric of the plurality of sectors, the RUM accumulation rate of sector i can be decreased by a positive amount. Further to the above, the RUM accumulation rate can be limited by maximum and/or minimum accumulation rates. The maximum rate can be determined to prevent a disadvantaged sector from excessively degrading neighboring sectors. The minimum rate, on the other hand, enables a sector to serve a few users seeing excessive interference even though the sector as a whole is not disadvantaged with respect to neighboring sectors. Further, the minimum and maximum accumulation rates can be established based on a degree of sector disadvantage as compared with neighboring sectors, as described herein.

According to one or more additional aspects of the subject disclosure, priority adjustment module 418 can update a RUM accumulation rate of a sector by a constant amount, or a variable amount. The constant amount can be predetermined based on various wireless characteristics of a mobile RAN site (e.g., interference, multi-path scattering). It should be appreciated that the wireless characteristics can be updated at various points in time, and utilized to modify the constant amount. The variable amount can be based on the various factors present during one or more epochs near in time to a particular epoch (e.g., a state of factors during the epoch k can be employed, an aggregated state of factors during epoch k and/or one or more prior epochs k-2, k-1, or the like). The various factors can include the performance metric of a sector or of one or more neighboring sectors, various wireless characteristics discussed above with respect to the constant amount, or a combination thereof or of the like. Accordingly, a RUM accumulation rate can be adjusted varying amounts. As an example, if a sector is significantly poorer than its neighboring sectors, a corresponding RUM accumulation rate can be increased a relatively large amount.

According to one or more other aspects, RUM management apparatus 402 can further comprise a priority module 422 and a request parser 424. Priority module 422 can establish a weight of a RUM issued by devices within the sector. The weight can be based at least in part on a current RUM accumulation rate for that sector. The weight can be utilized by receiving transmitters to determine whether the RUM should be obeyed or ignored (e.g. based on performance metric(s) of a sector associated with the receiving transmitters). RUM request parser 424 can employ the RUM accumulation rate to determine priority of a RUM received by a particular transmitter (e.g., a base station, an AT). Priority of the RUM can be based at least in part on the RUM accumulation rate of the receiving transmitter, analogous to the RUM weight discussed above. Thus, RUM request parser 424 can determine whether a RUM should be obeyed or ignored by a receiving transmitter based on the priority.

Figure 5:
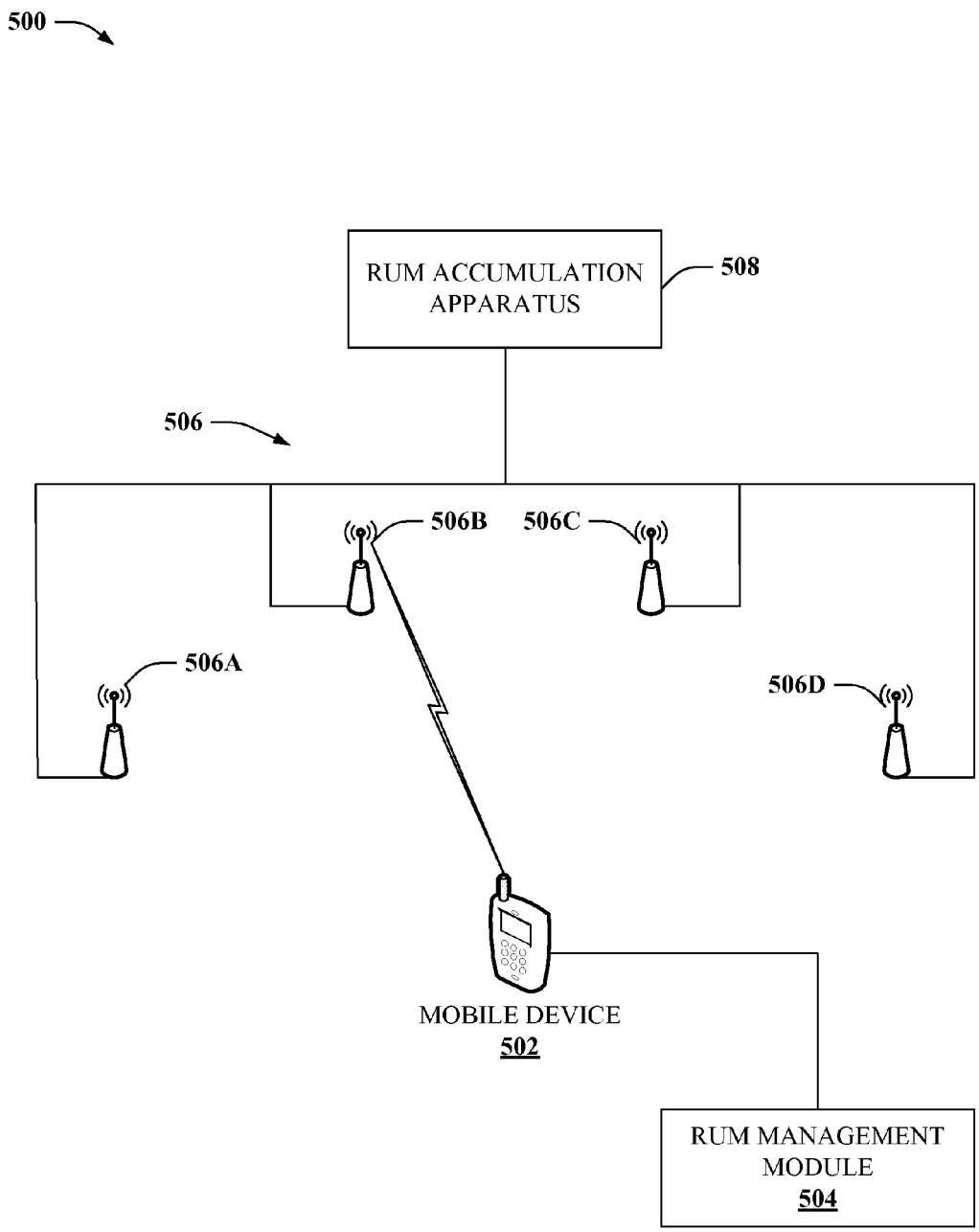
FIG. 5 depicts a block diagram of RUM management for a mobile AN according to aspects disclosed herein.

FIG. 5 depicts a block diagram of a system 500 that provides RUM management for a mobile AN according to aspects disclosed herein. System 500 can comprise a mobile device 502 coupled with base stations 506A, 506B, 506C, 506D of a RAN. Furthermore, the base stations are coupled to a backhaul network 506, by which the base stations can exchange data. A RUM accumulation apparatus 508 is coupled with the backhaul network. In one aspect, performance metric data for various sectors of the RAN are determined and shared among the base stations 506A, 506B, 506C, 506D via the backhaul network 506. In another aspect, performance metric data for the various sectors can be uploaded to the RUM accumulation apparatus 508 from the base stations 506A, 506B, 506C, 506D. According to still other aspects, performance metrics can be determined from OTA messages received at mobile devices 502 within the sectors. The mobile devices can analyze the OTA messages to determine performance metrics of such messages. Such metrics can then be provided to the RAN and base stations 506A, 506B, 506C, 506D and/or to the RUM accumulation apparatus 508 by way of such base stations 506A, 506B, 506C, 506D.

RUM accumulation apparatus 508 can determine RUM accumulation rates for sectors (506A, 506B, 506C, 506D) of the RAN, and distribute the RUMs to those sectors for utilization by devices of such sectors. In another aspect, the RUM accumulation rates for each sector can be determined by base stations 506A, 506B, 506C, 506D associated with such sectors. Accumulated RUMs can be distributed to mobile devices 502 once accumulated.

A RUM management module 504 coupled with a mobile device 502 can modulate a rate at which RUMs are issued to other devices in nearby sectors (506A, 506B, 506C, 506D). An issuance rate for a mobile device 502 can determine how often the device 502 can send accumulated RUMs. Issuance rates can be determined based on performance metrics of wireless transmissions in the sectors, determined as described above. Further, the RUM accumulation rates and/or RUM issuance rates can be updated based on changes in the metrics as described herein. Accordingly, system 500 provides a fairness-based mechanism for accumulating RUMs and issuing RUMs, utilizing performance metrics of a sector as compared with one or more neighboring sectors.

Figure 6:
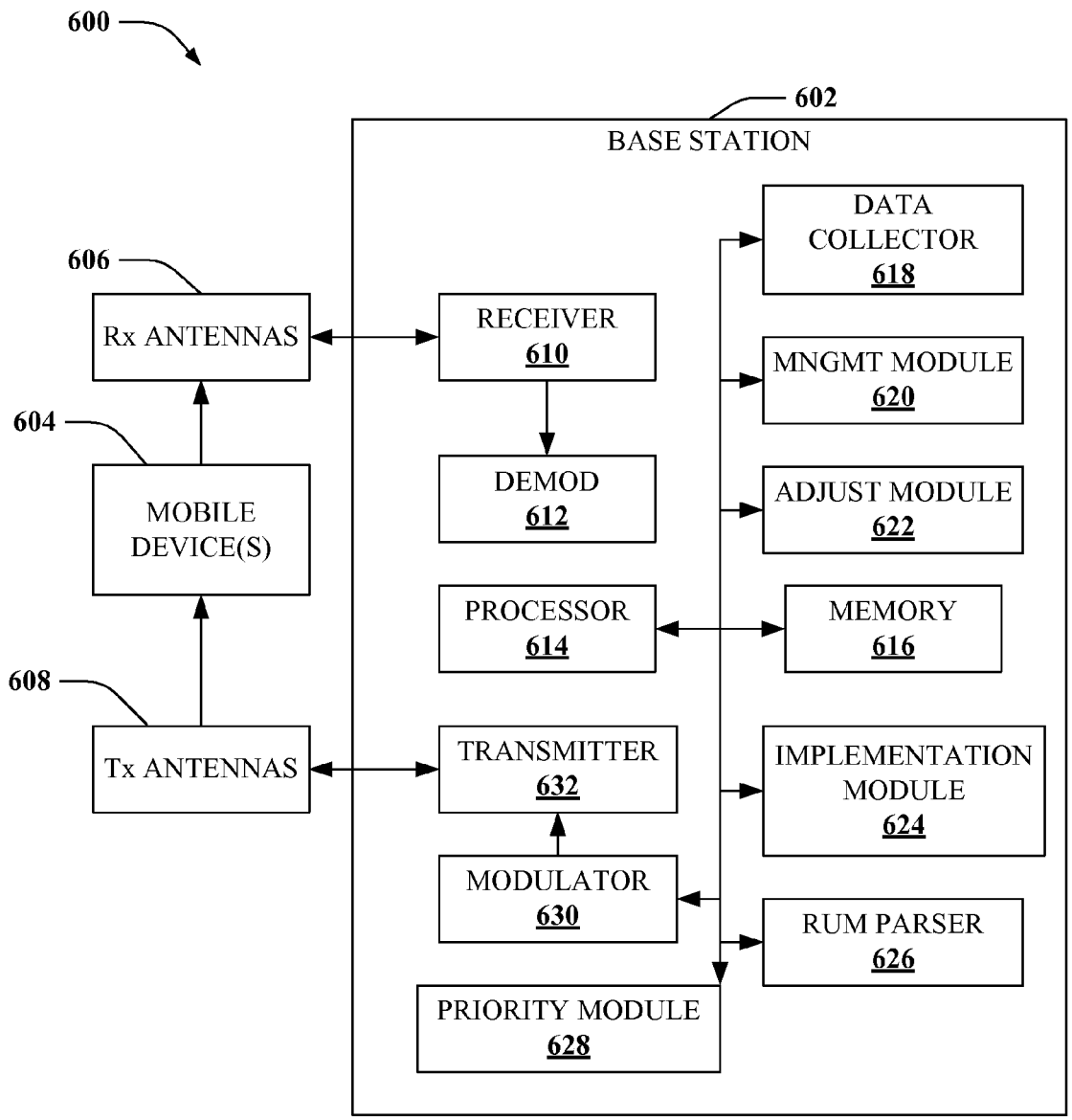
FIG. 6 illustrates a block diagram of a sample base station that provides RUM accumulation management based on sector performance.

FIG. 6 illustrates a block diagram of a system 600 comprising a sample base station 602 that provides RUM accumulation management based on performance metrics of sectors of a RAN. In at least one aspect of the subject disclosure, base station 602 can determine performance metrics based on wireless transmissions particular to a sector of the RAN. Furthermore, base station 602 can provide paging functions for the mobile network with respect to mobile devices 604 within a geographic area served by the network (e.g., see FIGS. 1 and 2). The base station 602 can continue broadcasting paging signals until a response is received by a target mobile device, a paging termination command is received from the mobile network, or an expiration timer maintained by the base station 602 expires, or a combination thereof In accordance with particular aspects, base station 602 can maintain a registration counter for the mobile device with respect to a tracking/location area served by the base station 602. Further, the registration counter can be maintained even though a mobile device fails to respond to a paging event. Accordingly, system 600 facilitates inter-system mobility by paging devices 604 independently of other systems (not depicted), and maintaining device registration in spite of a failed paging response (e.g., where the mobile device responds to the other system's page).

Base station 602 (e.g., access point, . . . ) can comprise a receiver 610 that receives signal(s) from one or more mobile devices 604 through a plurality of receive antennas 606, and a transmitter 632 that transmits signals to the one or more mobile devices 604 through a transmit antenna(s) 608. Receiver 610 can receive information from receive antennas 606 and can further comprise a signal recipient (not shown) that receives uplink data transmitted by mobile device(s) 604. Additionally, receiver 610 is operatively associated with a demodulator 612 that demodulates received information. Demodulated symbols are analyzed by a processor 614, which also provides symbols to a modulator 630 for transmission. Processor 614 is coupled to a memory 616 that stores information related to functions provided by base station 602. In one instance, stored information can comprise protocols for obtaining and/or determining performance metrics of wireless communications with mobile devices 604. Particularly, the stored information can comprise rules for determining or updating RUM accumulate rates as well as RUM issuance rates for such devices 604, depending on the performance metrics as compared with like metrics associated with a neighboring base station(s).

Processor 614 is further coupled to a data collector that can obtain performance metric information pertinent to base station 602 and at least one neighboring base station (not depicted). Information collected at data collector 618 can be stored in memory 616 for access by other components (612, 614, 620, 622, 624, 626, 628, 630) of base station 602. A management module 620 can establish a rate at which the mobile devices 604 within a sector served by base station 602 (and, e.g., communicatively coupled with) accumulate RUMs. The accumulation rate can be based on a comparison of the performance metrics associated with base station 602 as compared with the at least one other neighboring base stations, as described herein. Accumulation rates can be stored in memory 616 to be referenced by other components (612, 614, 620, 622, 624, 626, 628, 630) of the base station 602.

A priority adjustment module 622 can update RUM accumulation rates based on subsequent performance metrics base station 602 communications. Thus, if a median data rate for devices 604 coupled with base station 602 decreases as compared with median data rates for neighboring sectors, the priority adjustment module 602 can increase RUM accumulation rate for such devices 604. It should be appreciated that the foregoing example is only one mechanism for updating accumulation rate, and the subject disclosure should not be construed as limited to such example. Rather, other examples provided herein, examples known to one of skill in the art or made known to one of skill in the art by way of the context provided herein, are incorporated into the subject disclosure.

In addition to the foregoing, an implementation module 624 can determine a rate that devices 604 can send or issue accumulated RUMs. The issuance rate can be determined on various factors, including the RUM accumulation rate of the sector, number of devices 604 operating within the sector, one or more sector performance metrics, or a combination thereof or of the like. According to some aspects, the implementation module 624 can modulate the rate that devices 604 issue RUMs with the rate the sector accumulates RUMs (e.g., where the modulation can incorporate a weight of a RUM or can be of unit weight). In at least on other aspect, implementation module 624 can determine whether a terminal within a sector served by base station 602 sends a RUM based at least in part on the RUM accumulation rate and/or RUM issuance rate.

Base station 602 can further comprise a RUM request parser 626 that determines priority of a RUM received by a mobile device 604 from a neighboring sector. The priority can be established based on the RUM accumulation rate and a corresponding rate and/or performance metric of the other sector. Additionally, base station 602 can comprise a priority module 628 that adjusts a weight of a RUM issued or sent by devices 604 in the sector based at least in part on the RUM accumulation rate. Accordingly, neighboring devices that receive the RUM can determine whether to obey the issued RUM based at least in part on the weight. Optionally, where a RUM is of unit weight, it must be obeyed by all such neighboring devices.

Figure 7:
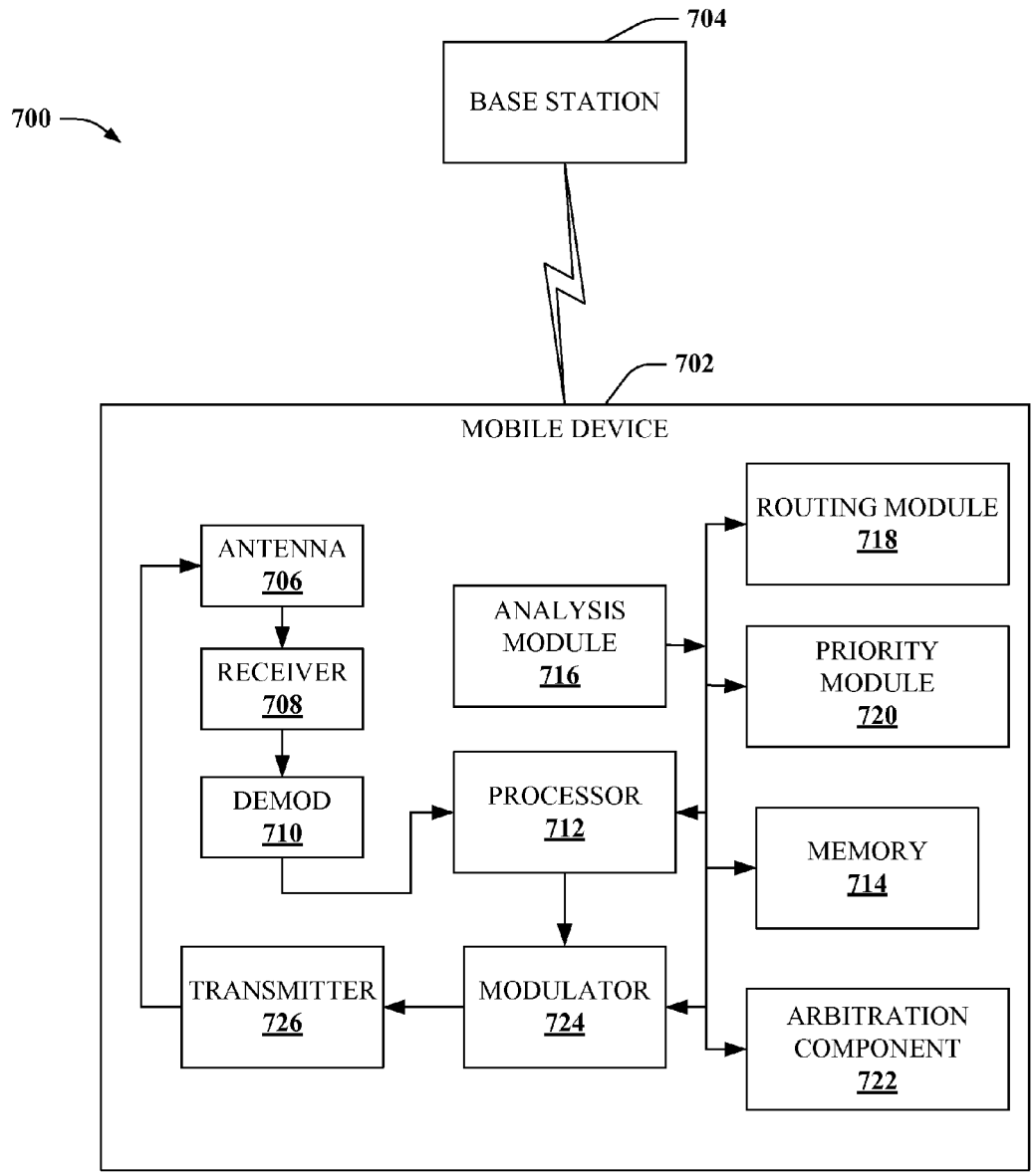
FIG. 7 depicts a block diagram of an example access terminal that facilitates aggregation of sector performance metrics for sector RUM management.

FIG. 7 illustrates a block diagram of an example system 700 that comprises a mobile device 702. Mobile device 702 can be configured to wirelessly couple with one or more base stations 704 and affiliated mobile networks (not depicted). Mobile device 702 can additionally be configured to obtain performance metrics of nearby base stations and transmit the metrics to a serving base station 704, as described herein.

Mobile device 702 includes at least one antenna 706 (e.g., a transmission receiver or group of such receivers comprising an input interface) that receives a signal (e.g., a wireless signal, such as an OTA message) and receiver(s) 708, which performs typical actions (e.g., filters, amplifies, down-converts, etc.) on the received signal. According to at least some aspects, processor(s) 712 can analyze signals received from demodulator(s) 710 and obtain wireless performance metrics of such signals. In general, antenna 706 and transmitter 726 (collectively referred to as a transceiver) can be configured to facilitate wireless data exchange with base station(s) 704.

Antenna 706 and receiver(s) 708 can also be coupled with the demodulator(s) 710 that can demodulate received symbols and provide them to the processor(s) 712 for evaluation. In some aspects, receiver 708 can receive OTA transmissions from base stations (704). In a particular example, the receiver 708 can obtain OTA transmissions from a neighboring base station (e.g. as part of broadcast signals from such base station) comprising a performance metric of the neighboring base station. The OTA message can be analyzed at mobile device 702 and/or forwarded to base station 704 for analysis. Additionally, receiver 708 can obtain a second OTA message from the neighboring base station comprising a RUM, requiring the mobile device 702 to reduce power at the transmitter 726.

It should be appreciated that processor(s) 712 can control and/or reference one or more components (706, 708, 710, 714, 716, 724, 726) of the mobile device 702. Further, processor(s) 712 can execute one or more modules, applications, engines, or the like (716, 718, 720, 722) that comprise information or controls pertinent to executing functions of the mobile handset 702. For instance, such functions can include conducting wireless communications with remote devices (704), receiving OTA messages, analyzing such messages, determining wireless performance metrics of wireless transmissions, receiving and processing RUMs, or the like, as described herein.

Mobile handset 702 can additionally include memory 714 that is operatively coupled to processor(s) 712. Memory 714 can store data to be transmitted, received, and the like, and instructions suitable to conduct wireless communication with remote device (704). Further, memory 716 can store the modules, applications, engines, etc. (718, 720, 722) executed by processor(s) 714, above.

In some aspects of the disclosure, mobile device 702 can comprise an analysis module 716 that determines performance metrics (e.g., average or median data rate, interference, SNR, etc.) of wireless signals received at the mobile device 702. Furthermore, a routing module 718 can wirelessly transmit performance metrics of one or more OTA messages obtained at receiver 708 to a base station 704 serving the mobile device 702. Based at least in part on a value of the performance metric, the serving base station 702 can send a message to the mobile device 704 that includes a RUM. The RUM can be issued to mobile device 702 for use by such device 702 in managing nearby transmitter power, or can be a similar such message sent to mobile device 702 to reduce power at transmitter 726.

According to particular aspects of the disclosure, mobile device 702 can comprise a priority module 720 that identifies and processes a weighting factor for a received RUM. In addition, the priority module 720 can determine a weighting factor for a RUM issued for use by the mobile device 702. In either case, weighting can be determined at least in part by a RUM accumulation rate associated with a sector serving the mobile device 702. An arbitration component 722 can instruct processor 712 to obey a DL RUM (e.g., pertaining to RL data transmitted by the mobile device 702) based on a comparison of a weighting factor of the DL RUM and a performance metric of the sector. Arbitration rules stored in memory 714 can determine when the DL RUM should be obeyed based on such comparison.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include a RUM accumulation apparatus 302, RUM control apparatus 408, and RUM management module 504, or a different combination of these and other components. Sub-components could also be implemented as components communicatively coupled to other components rather than included within parent components. Additionally, it should be noted that one or more components could be combined into a single component providing aggregate functionality. For instance, data collector 308 can include memory 312, or vice versa, to facilitate receiving performance metrics of wireless communications and storing the received metric information by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
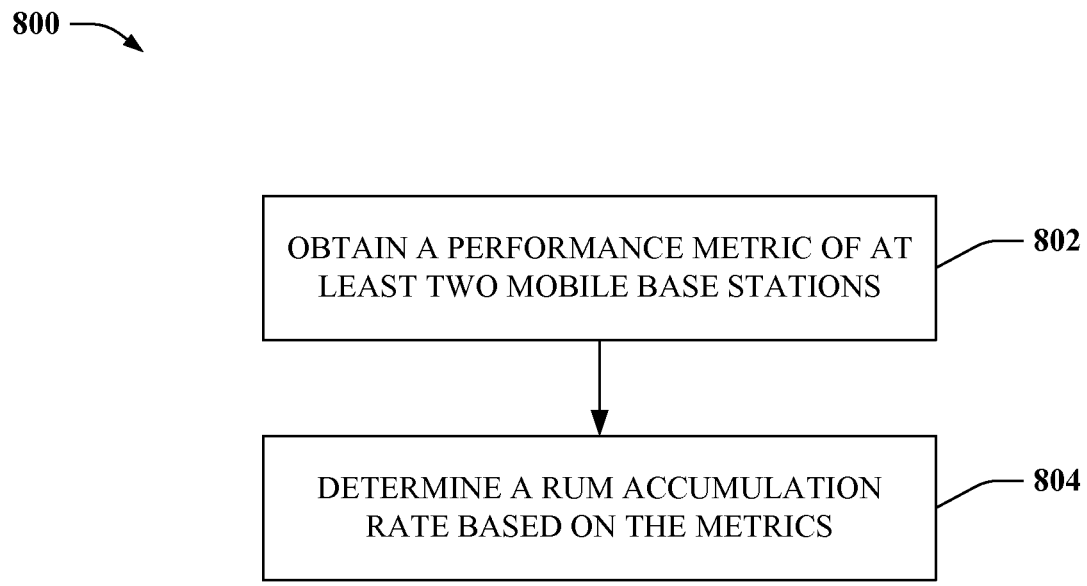
FIG. 8 illustrates a flowchart of an example methodology providing RUM accumulation based on performance metrics of a mobile AN.
Figure 9:
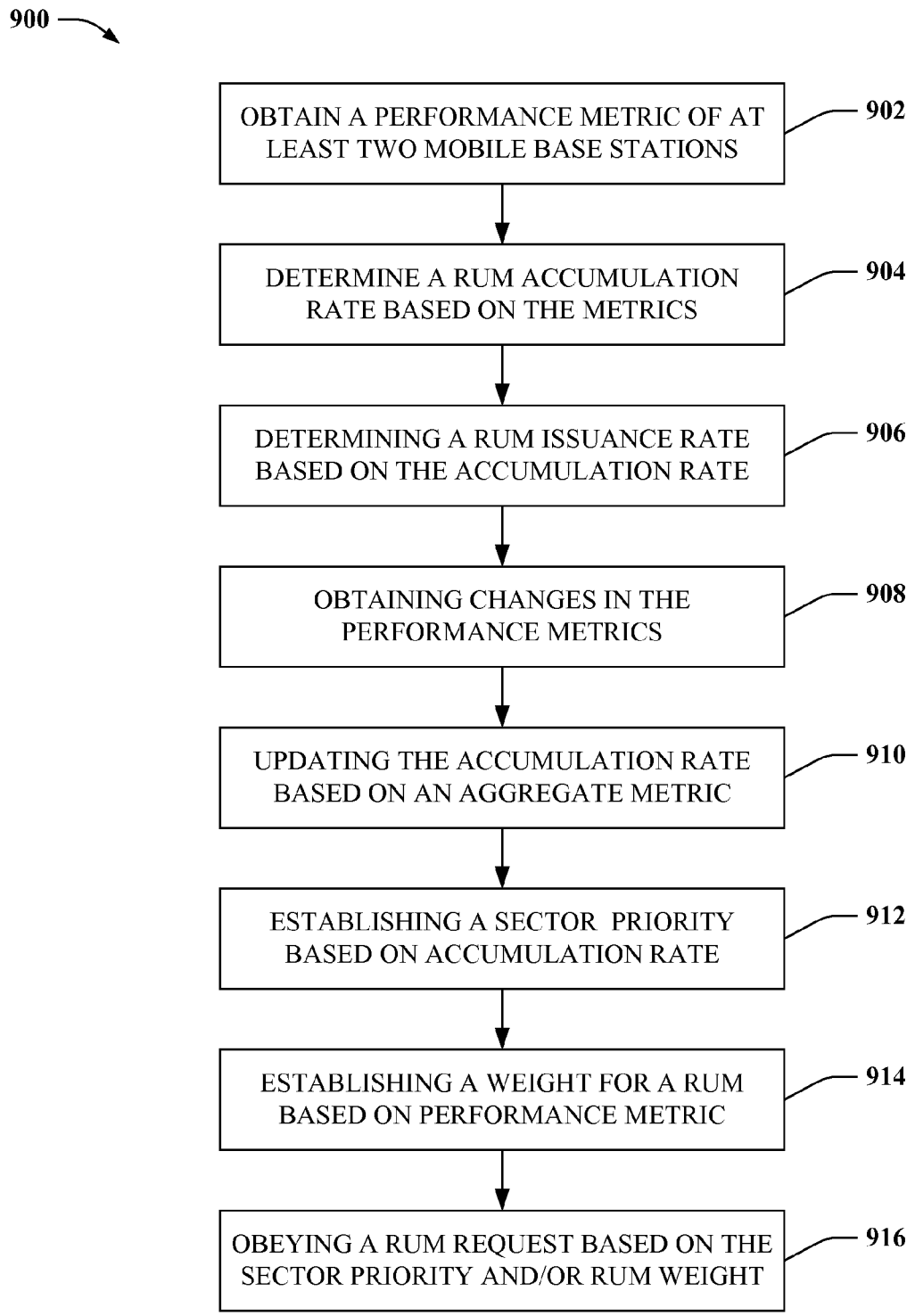
FIG. 9 depicts a flowchart of a sample methodology for providing RUM management based on aggregate sector performance metrics.
Figure 10:
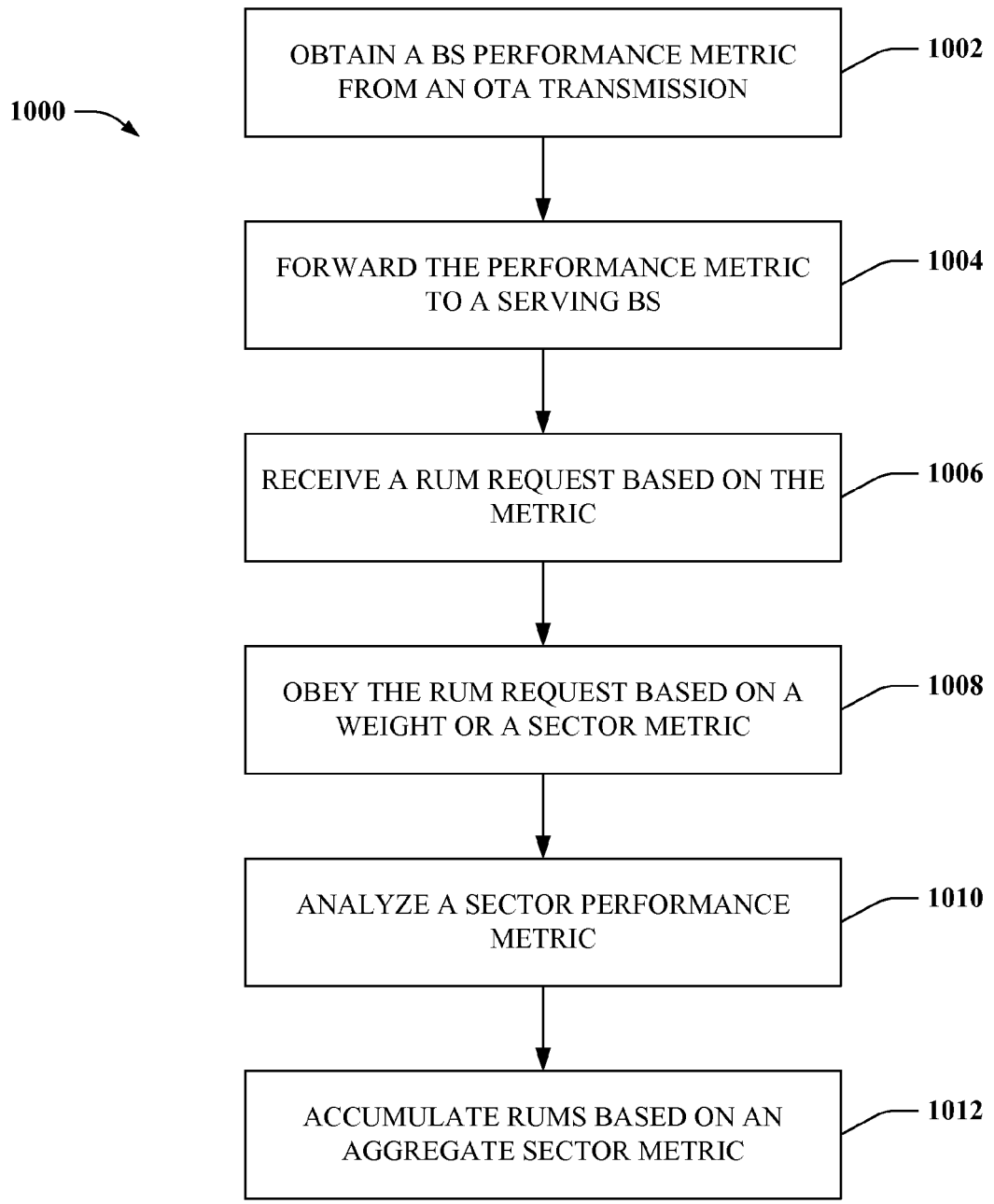
FIG. 10 depicts a flowchart of a sample methodology for facilitating RUM management based on one or more aspects.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 8 depicts a flowchart of an example methodology 800 that provides inter-sector fairness in reduction of interference for mobile communications. At 802, method 800 can obtain a performance metric of at least two mobile base stations. The performance metric can be pertinent to quality of wireless communications associated with the two mobile base stations. As specific examples, the performance metric can comprise median data rate, average data rate, signal interference, SNR, percentage of a guaranteed bit rate satisfied, or a like metric of wireless signals, or a combination thereof.

In one or more aspects, the at least two mobile base stations can be neighboring base stations of a mobile RAN site. In such circumstance, the wireless transmissions of the base stations can often interfere with each other at receiving devices. Performance metrics of such signals can be determined at the receiving devices and transmitted back to the base stations. In another aspect, the performance metrics can be obtained from uplink signals received at the base stations from the wireless devices (e.g., the metrics can be specified within the uplink signals, or the uplink signals themselves can be analyzed to determine performance metrics of such signals). Performance metric information can be shared among the base stations, aggregated at a common control device, and/or shared with the mobile devices for further analysis.

At 804, method 800 can determine a RUM accumulation rate for devices within a sector of the mobile RAN site. The rate can be based at least in part on a comparison of the performance metrics of the at least two base stations. As a particular example to illustrate the foregoing, an average data rate of a sector can be compared with an average data rate of a neighboring sector(s). The RUM accumulation rate can then be established based on this comparison. In one particular aspect, the performance metric data for all sectors can be aggregated to form aggregate sector performance metric data. A RUM accumulation rate for each sector can be based on a comparison of the performance metric for each sector with the aggregate sector performance metric data. Accordingly, method 800 provides an algorithm to establish RUM accumulation based on wireless communication performance relationships among sectors of a mobile RAN site. By way of such algorithm, a likelihood that performance of a sector is improved at the expense of a poorly performing sector can be reduced, providing increased reliability for mobile communications.

FIG. 9 illustrates a flowchart of an example methodology 900 that can manage RUM accumulation rates of sectors of a mobile RAN site to provide inter-sector fairness for the site. At 902, method 900 can obtain a performance metric of at least two mobile base stations. At 904, method 900 can determine a RUM accumulation rate for sectors of the mobile RAN site served by each of the at least two base stations. At 906, method 900 can determine a RUM issuance rate for devices of each sector based at least in part on the RUM accumulation rate. Thus, a frequency with which a particular device (or, e.g. an aggregate of devices) can issue RUMs can be determined utilizing the accumulation rate. Other factors determining the issuance rate can include number of devices in the sector, performance metrics associated with the particular device as compared with the other devices of the sector, type of call the particular device is engaged in (e.g., high quality of service calls can be given a higher issuance rate to maintain performance of such calls, low quality of service calls can be given a lower issuance rate since quality doesn't have as much of a relative impact, and so on), or the like or a combination thereof.

At 908, method 900 can obtain changes in the performance metrics. For instance, the performance metrics can be re-evaluated at a subsequent point in time. As a particular example, the performance metrics can be re-evaluated periodically. Current performance metrics (or, e.g. changes in the current metrics as compared with prior metrics) can be utilized to re-evaluate the RUM accumulation rates. At 910, method 900 can update the accumulation rate of sectors of the mobile RAN site based on a comparison of sector performance with an aggregate sector performance metric. Thus, if a sector performance metric is lower than the aggregate performance metric (or, e.g., less than the aggregate performance metric by a threshold amount), a RUM accumulation rate of such sector can be increased. Where the sector performance metric is greater than the aggregate performance metric (or, e.g. greater than the aggregate performance metric plus a threshold amount), the RUM accumulation rate of the sector can be decreased. Where the sector performance metric is substantially equivalent to the aggregate performance metric, the RUM accumulation rate can be increased, decreased, or left unchanged. In addition to the foregoing, changes in sector performance metric can be based on a constant quantity (e.g. determined based on prior RUM accumulation rates, wireless conditions of the mobile RAN site, time-averaged statistics of the mobile RAN site, or the like), or based on a variable quantity determined at least in part by the RUM accumulation rate, a disparity in the performance metric of the sector as compared with at least one neighboring sector (e.g., the aggregate performance sector), or the like, or a combination thereof.

At 912, method 900 can establish a sector priority based on accumulation rate. The sector priority can be utilized to determine whether a RUM accumulation rate received at a device of the sector is to be obeyed by the receiving device. The priority can be based at least in part on a RUM accumulation rate of the sector. Alternatively, or in addition, the priority can be based on a weight of the received RUM. At 914, method 900 can establish a weight for a RUM issued by a device of the sector based at least in part on the performance metric of the sector, or the RUM accumulation rate. At 916, a device is instructed to obey a received RUM based on the sector priority, a weight of the RUM, or both.

FIG. 10 illustrates a flowchart of an example methodology 1000 that facilitates inter-sector fairness for a mobile RAN site. At 1002, method 1000 can obtain a base station performance metric from an OTA transmission originated from the base station. At 1004, method 1000 can forward the performance metric to a serving base station. At 1006, method 1000 can receive a RUM based at least in part on the performance metric. At 1008, method 1000 can obey the RUM based on a weight of the RUM, or a performance metric of a serving sector, or both. Obeying the RUM can further comprise reducing power of wireless transmissions. At 1010, method 1000 can analyze a sector performance metric of the serving sector. The analysis can be pertinent to a received OTA message from the serving base station. At 1012, method 1000 can accumulate RUMs based at least in part on the sector performance metric as compared with an aggregate sector performance metric, where the aggregate sector performance metric comprises at least information pertinent to the base station.

Figure 11:
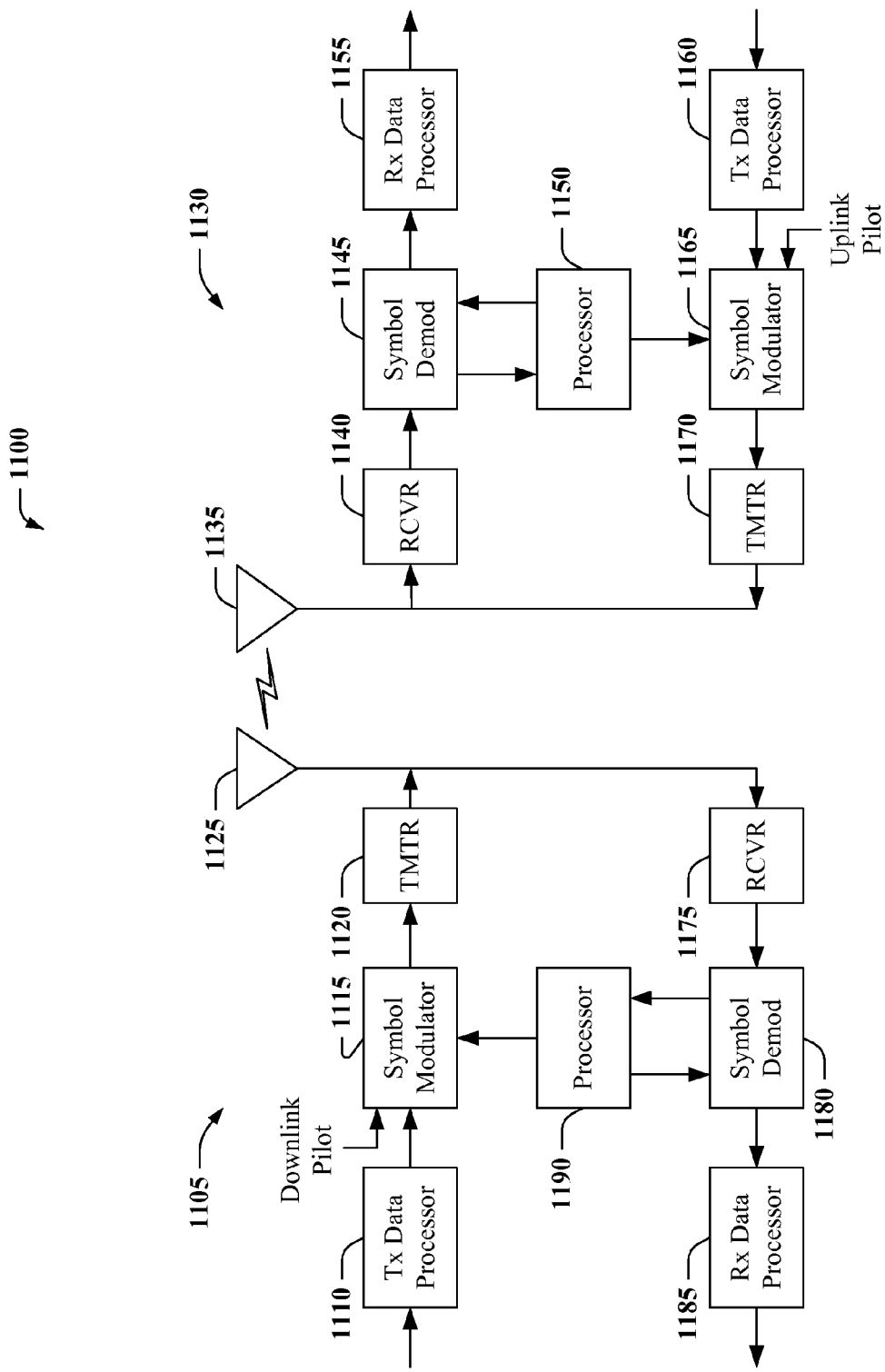
FIG. 11 illustrates a block diagram of an example system that provides wireless communication between devices according to aspects of the subject disclosure.

FIG. 11 depicts a block diagram of an example system 1100 that can facilitate wireless communication according to some aspects disclosed herein. On a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1120 multiplexes data and pilot symbols and provides them to a transmitter unit (TMTR) 1120. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1120 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 demodulates and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105. Specifically, the uplink signal can be in accordance with SC-FDMA requirements and can include frequency hopping mechanisms as described herein.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink. Multiple terminals can transmit pilot concurrently on the uplink on their respective assigned sets of pilot subbands, where the pilot subband sets can be interlaced.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1190 and 1150.

Figure 12:
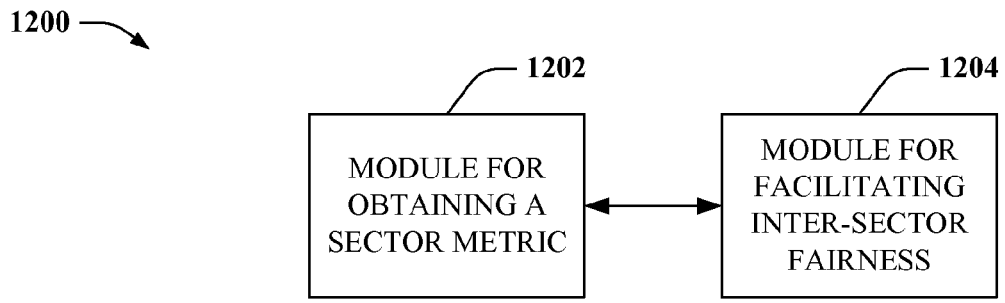
FIGS. 12 and 13 depict block diagrams of example systems that provide RUM accumulation based on sector performance metrics of a mobile AN.
Figure 13:
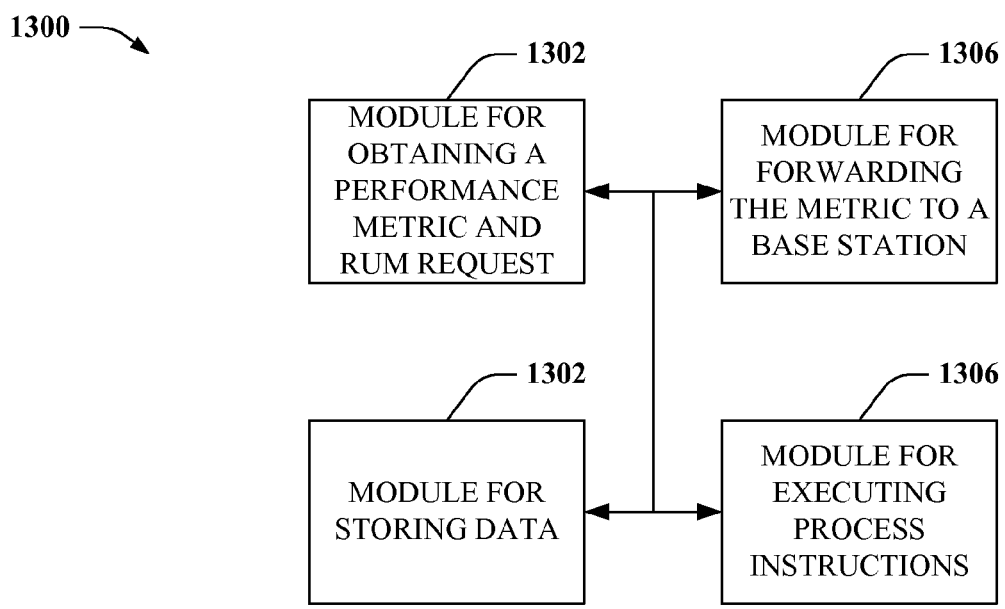

FIGS. 12 and 13 depict block diagrams of example systems 1200, 1300 that provide and/or facilitate RUM accumulation based on sector performance metrics of a mobile AN. System 1200 comprises a module 1202 for obtaining a performance metric of a sector of a mobile RAN site. The module 1202 can further obtain a performance metric of at least one neighboring sector. In at least one aspect, the performance metrics can be aggregated into a single aggregated metric of wireless communications of the mobile RAN site. System 1200 can further comprise a module 1204 that establishes a rate at which devices within the sector accumulate RUMs. Module 1204 can establish the rate at least in part on a comparison of the performance rate for the sector and the performance rate(s) of the neighboring sector(s). In one particular aspect, module 1204 can establish the rate based on the performance rate for the sector and an aggregate performance rate of sectors of the mobile RAN site.

System 1300 can comprise a module 1302 for obtaining wireless OTA messages. The module can obtain first OTA message that comprises a performance metric of a sector of a mobile AN. The module 1302 can further obtain a second OTA message that comprises a RUM. The first OTA message and/or second OTA message, and information related thereto, can be maintained in a module 1306 for storing data. In addition to the foregoing, system 1300 can comprise a module 1304 for forwarding OTA messages to a serving base station. The module 1304 can forward, for instance, the first OTA message, or at least the performance metric, to the serving base station. In one particular aspect, a response to the first OTA message from the serving base station can determine whether the RUM is to be obeyed by system 1300. Such determination can be implemented by a module 1308 for executing process instructions, where such instructions are based at least in part on the performance metric of the sector, a weight of the RUM, or a combination of both.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes", "has" or "having" are used in either the detailed description or the claims, such terms are intended to be inclusive in a manner similar to the term "comprising" as "comprising" is interpreted when employed as a transitional word in a claim.

What is claimed is:

1. A method of managing mobile communications, comprising:
   obtaining, at a sector of a mobile access network a performance metric for at least one neighboring sector; and
   implementing inter-sector resource utilization fairness based at least in part on the performance metric of the at least one neighboring sector, wherein implementing inter-sector resource utilization fairness comprises establishing a rate of accruing interference avoidance credits.

2. The method of claim 1, wherein implementing inter-sector resource utilization fairness comprises at least one of:
   accruing an interference avoidance credit at the sector;
   requesting one or more neighboring sectors to modify transmit power on a subset of wireless resources; or
   modifying transmit power of the sector on the subset of wireless resources.

3. The method of claim 2, wherein requesting the one or more neighboring sectors to modify transmit power further comprises at least one of:
   instructing a user equipment to submit the request over-the-air to the one or more neighboring sectors; or
   submitting the request over a backhaul network coupling the one or more neighboring sectors with the sector.

4. The method of claim 2, wherein implementing inter-sector resource utilization fairness further comprises:
   limiting a rate of requesting the one or more neighboring sectors to modify transmit power based on the rate of accruing interference avoidance credits.

5. The method of claim 2, further comprising limiting a rate of requesting the one or more neighboring sectors to modify transmit power by a maximum or minimum rate.

6. The method of claim 2, wherein the interference avoidance credit comprises a resource utilization message.

7. The method of claim 1, wherein implementing inter-sector resource utilization fairness comprises:
   obtaining a performance metric for the sector of the mobile access network; and
   establishing a rate at which the sector accumulates resource utilization messages based at least in part on a comparison of the performance metric of the sector and the performance metric of the at least one neighboring sector.

8. The method of claim 7, further comprising issuing a resource utilization message to the neighboring sector over a backhaul network based at least in part on the resource utilization message accumulation rate or performance metric comparison.

9. The method of claim 7, further comprising allowing a terminal within the sector to issue a resource utilization message based at least in part on the resource utilization message accumulation rate or performance metric comparison.

10. The method of claim 7, further comprising providing a minimum or maximum resource utilization message issuance rate based on the resource utilization message accumulation rate or performance metric comparison.

11. The method of claim 7, further comprising modulating a rate for issuing resource utilization messages by a rate of accumulating resource utilization messages of unit weight.

12. The method of claim 7, further comprising updating the resource utilization message accumulation rate based at least in part on a change in subsequent performance metrics of the sector or the neighboring sector.

13. The method of claim 12, further comprising updating the resource utilization message accumulation rate by a predetermined constant.

14. The method of claim 12, further comprising updating the resource utilization message accumulation rate by a variable rate that depends at least in part on the performance metric of the sector.

15. The method of claim 1, further comprising employing a median data rate, an average data rate, throughput, delay, latency, bandwidth, signal strength, traffic load of a sector, number of terminals served by a sector, guaranteed bit rate compliance, or a combination thereof, as the performance metric.

16. The method of claim 1, wherein implementing inter-sector resource utilization fairness further comprises aggregating performance metrics of a plurality of sectors of the mobile access network.

17. The method of claim 16, further comprising increasing a rate of requesting the at least one neighboring sector to modify transmit power if a performance metric for the sector is less than the aggregate performance metric.

18. The method of claim 16, further comprising decreasing a rate of requesting the at least one neighboring sector to modify transmit power if a performance metric for the sector is greater than or equal to the aggregate performance metric.

19. The method of claim 1, further comprising at least one of:
   employing a network backhaul to collect performance metric information from the at least one neighboring sector; or
   receiving the performance metric information from a user terminal served by the mobile access network.

20. The method of claim 1, further comprising employing a measure of the inter-sector resource utilization fairness to determine priority of a resource utilization message issued by the neighboring sector.

21. The method of claim 1, further comprising weighting priority of a resource utilization message issued by the sector based at least in part on a measure of the inter-sector resource utilization fairness.

22. An apparatus that manages wireless communications, comprising:
- a data collector that obtains, at a sector of a mobile access network, a performance metric for at least one neighboring sector;
- a management module that implements inter-sector resource utilization fairness based at least in part on the performance metric of the at least one neighboring sector, wherein implementing inter-sector resource utilization fairness comprises establishing a rate of accruing interference avoidance credits;
- memory that stores obtained performance metric data and instructions for modules of the apparatus; and
- a processor that executes the instructions stored in the memory to implement functions of the apparatus.

23. The apparatus of claim 22, wherein the management module implements inter-sector resource utilization fairness by at least one of:
- accruing an interference avoidance credit at the sector;
- requesting one or more neighboring sectors to modify transmit power on a subset of wireless resources; or
- modifying transmit power of the sector on the subset of wireless resources.

24. The apparatus of claim 23, wherein the management module at least one of:
- instructs a user equipment to submit the request over the air to the one or more neighboring sectors; or
- submits the request over a backhaul network coupling the one or more neighboring sectors with the sector.

25. The apparatus of claim 23, wherein the management module further implements inter-sector resource utilization fairness by:
- limiting a rate of requesting the one or more neighboring sectors to modify transmit power based on the rate of accruing interference avoidance credits.

26. The apparatus of claim 23, wherein the management module limits a rate of requesting the one or more neighboring sectors to modify transmit power by a maximum or minimum rate.

27. The apparatus of claim 23, wherein the interference avoidance credit comprises a resource utilization message.

28. The apparatus of claim 22, wherein:
- the data collector obtains a performance metric for the sector of the mobile access network; and
- the management module establishes a resource utilization message accumulation rate for the sector based at least in part on a comparison of the performance metric of the sector and the performance metric of the at least one neighboring sector.

29. The apparatus of claim 28, further comprising an implementation module that at least one of:
- issues a resource utilization message to the neighboring sector over a backhaul network based at least in part on the resource utilization message accumulation rate or performance metric comparison; or
- instructs a terminal within the sector to issue the resource utilization message based at least in part on the resource utilization message accumulation rate or performance metric comparison.

30. The apparatus of claim 29, wherein the implementation module modulates a rate for issuing resource utilization messages by a rate of accumulating resource utilization messages of unit weight.

31. The apparatus of claim 29, wherein the implementation module provides a minimum or maximum resource utilization message issuance rate based at least in part on the resource utilization message accumulation rate or performance metric comparison.

32. The apparatus of claim 28, further comprising a priority adjustment module that updates the resource utilization message accumulation rate based at least in part on a change in subsequent performance metrics of the sectors.

33. The apparatus of claim 32, wherein:
- the data collector aggregates performance metric data for a plurality of sectors of the mobile access network; and
- a resource utilization message accumulation rate for the sector is based at least in part on the aggregate performance metric data.

34. The apparatus of claim 33, wherein the priority adjustment module increases a rate of requesting the at least one neighboring sector to modify transmit power if a performance metric for the sector is less than the aggregate performance metric.

35. The apparatus of claim 33, wherein the priority adjustment module decreases a rate of requesting the at least one neighboring sector to modify transmit power if a performance metric for the sector is greater than or equal to the aggregate performance metric.

36. The apparatus of claim 32, wherein the priority adjustment module updates the resource utilization message accumulation rate by a predetermined constant.

37. The apparatus of claim 32, wherein the priority adjustment module updates the resource utilization message accumulation rate a variable rate that depends at last in part on the performance metric of the sector or the performance metric of the at least one neighboring sector.

38. The apparatus of claim 22, wherein the performance metric comprises a median data rate, an average data rate, throughput, delay, latency, bandwidth, signal strength, traffic load of a sector, number of terminals served by a sector, guaranteed bit rate compliance, or a combination thereof.

39. The apparatus of claim 22, wherein the data collector obtains the performance metric via a network backhaul.

40. The apparatus of claim 22, wherein the data collector obtains the performance metric from a user terminal served by the mobile access network.

41. The apparatus of claim 22, further comprising a resource utilization message parser that employs a measure of the inter-sector resource utilization fairness to determine priority for a resource utilization message issued by the neighboring sector.

42. The apparatus of claim 22, further comprising a priority module that adjusts a weight of a resource utilization message issued by a device of the sector based at least in part on a measure of the inter-sector resource utilization fairness.

43. An apparatus configured to manage mobile communications, comprising:
- means for obtaining, at a sector of a mobile access network, a performance metric of at least one neighboring sector; and
- means for implementing inter-sector resource utilization fairness based at least in part on the performance metric of the at least one neighboring sector, wherein implementing inter-sector resource utilization fairness comprises establishing a rate of accruing interference avoidance credits.

44. The apparatus of claim 43, wherein the means for implementing inter-sector resource utilization fairness comprises means for establishing a resource utilization message accumulation rate for the sector based on the performance metric of the at least one neighboring sector or a performance metric of the sector, or a comparison of such metrics.

45. The apparatus of claim 44, further comprising means for determining a rate for sending resource utilization messages based at least in part on the resource utilization message accumulation rate.

46. The apparatus of claim 44, further comprising means for updating the resource utilization message accumulation rate based at least in part on a change in the comparison.

47. The apparatus of claim 46, further comprising means for aggregating the performance metric for a plurality of sectors, wherein the means for updating adjusts the resource utilization message accumulation rate based at least in part on an aggregated performance metric.

48. The apparatus of claim 47, wherein the means for updating at least one of:
increases the resource utilization message accumulation rate if the performance metric for the sector is less than the aggregated performance metric; or
decreases the resource utilization message accumulation rate if the performance metric for the sector is greater than or equal to the aggregated performance metric.

49. A processor configured to manage mobile communications, comprising:
a first module that obtains, at a sector of a mobile access network, a performance metric of at least one neighboring sector; and
a second module that implements inter-sector resource utilization fairness based at least in part on the performance metric of the at least one neighboring sector, wherein implementing inter-sector resource utilization fairness comprises establishing a rate of accruing interference avoidance credits.

50. A non-transitory computer-readable medium, comprising:
computer-readable instructions configured to manage mobile communications, the instructions are executable by at least one computer to:
obtain, at a sector of a mobile access network, a performance metric for at least one neighboring sector; and
implement inter-sector resource utilization fairness based at least in part on the performance metric of the at least one neighboring sector, wherein implementing inter-sector resource utilization fairness comprises establishing a rate of accruing interference avoidance credits.

* * * * *